United States Patent
Hori et al.

(10) Patent No.: US 7,428,307 B2
(45) Date of Patent: Sep. 23, 2008

(54) DATA REPRODUCTION APPARATUS CAPABLE OF SAFELY CONTROLLING REPRODUCTION TIME OF ENCRYPTED CONTENT DATA AND DATA REPRODUCTION CIRCUIT AND DATA RECORDING APPARATUS USED FOR THE SAME

(75) Inventors: Yoshihiro Hori, Gifu (JP); Takayuki Hasebe, Kawasaki (JP); Tatsuya Hirai, Kawasaki (JP)

(73) Assignees: Sanyo Electric Co., Ltd., Osaka (JP); Fujitsu Limited, Kanagawa (JP); Hitachi, Ltd., Tokyo (JP)

( * ) Notice: Subject to any disclaimer, the term of this patent is extended or adjusted under 35 U.S.C. 154(b) by 577 days.

(21) Appl. No.: 10/482,681

(22) PCT Filed: Jun. 26, 2002

(86) PCT No.: PCT/JP02/06452

§ 371 (c)(1),
(2), (4) Date: Dec. 31, 2003

(87) PCT Pub. No.: WO03/005637

PCT Pub. Date: Jan. 16, 2003

(65) Prior Publication Data

US 2004/0179691 A1   Sep. 16, 2004

(30) Foreign Application Priority Data

Jul. 2, 2001   (JP) ............................. 2001-201000

(51) Int. Cl.
*H04L 9/00*   (2006.01)

(52) U.S. Cl. ................ 380/277; 380/201; 380/203; 380/230; 380/270; 713/155; 713/156; 713/175; 713/158; 726/26; 726/28; 705/51; 705/55; 709/204; 709/231

(58) Field of Classification Search ............... 713/193, 713/158, 155, 156, 175; 380/270, 277, 230, 380/203, 201, 30; 705/51, 59, 52, 54, 55; 726/26, 28, 30; 709/204, 231
See application file for complete search history.

(56) References Cited

U.S. PATENT DOCUMENTS

| | | | |
|---|---|---|---|
| 5,915,021 A * | 6/1999 | Herlin et al. | 705/67 |
| 6,256,391 B1 * | 7/2001 | Ishiguro et al. | 380/203 |
| 6,477,649 B2 * | 11/2002 | Kambayashi et al. | 726/27 |
| 6,574,611 B1 * | 6/2003 | Matsuyama et al. | 705/57 |
| 6,687,683 B1 * | 2/2004 | Harada et al. | 705/51 |
| 6,697,945 B2 * | 2/2004 | Ishiguro et al. | 713/171 |
| 6,834,346 B1 * | 12/2004 | Ishibashi et al. | 713/179 |
| 6,915,434 B1 * | 7/2005 | Kuroda et al. | 713/193 |
| 7,099,479 B1 * | 8/2006 | Ishibashi et al. | 380/281 |
| 2001/0044897 A1 * | 11/2001 | Ishiguro et al. | 713/171 |
| 2002/0032905 A1 * | 3/2002 | Sherr et al. | 725/38 |
| 2002/0071559 A1 * | 6/2002 | Christensen et al. | 380/277 |
| 2002/0101990 A1 * | 8/2002 | Morino et al. | 380/210 |

FOREIGN PATENT DOCUMENTS

| | | |
|---|---|---|
| CN | 1262770 A | 8/2000 |
| CN | 1262770 T | 8/2000 |
| EP | 0 989 557 A1 | 1/1999 |
| JP | 11-232776 A | 8/1999 |
| WO | WO 99/38164 A | 7/1999 |

OTHER PUBLICATIONS

K. Yamanaka et al., "Copyright Protection in Multimedia on Demand Services", NTT R&D, Sep. 10, 1995, vol. 44, No. 9, pp. 813-818.

* cited by examiner

*Primary Examiner*—Nasser Moazzami
*Assistant Examiner*—Shanto Abedin
(74) *Attorney, Agent, or Firm*—McDermott Will & Emery LLP

(57) ABSTRACT

A decryption processing unit decrypts encrypted content data using a license key Kc. When an elapsed time after reception of the license key (Kc) does not exceed a hold time at a time of the license key (Kc) included in reproduction control information (ACp), reproduction of encrypted content data continues. When the elapsed time exceeds the hold time at a time, the license key (Kc) is discarded, and a reproduction control unit again obtains a license key (Kc) from a memory card. Discarding and reobtaining license key (Kc) continues until an allowable output count of license key (Kc) from the memory card becomes zero. As a result, a reproduction time of encrypted content data can be controlled safely.

12 Claims, 14 Drawing Sheets

FIG.2

| SYMBOL | TYPE | ATTRIBUTE | CHARACTERISTICS |
|---|---|---|---|
| Dc | CONTENT DATA | UNIQUE TO CONTENT | EXAMPLE: MUSIC DATA, STORY DATA, EDUCATIONAL DATA, IMAGE DATA ENCRYPTED CONTENT DATA DECRYPTED BY Kc DISTRIBUTED AS {Dc}Kc AND HELD IN MEMORY CARD |
| Dc-inf | ADDITIONAL INFORMATION | UNIQUE TO CONTENT | PLAINTEXT ACCOMPANYING Dc |
| Kc | LICENSE | UNIQUE TO CONTENT | LICENSE DECRYPTION KEY FOR DECRYPTING ENCRYPTED CONTENT DATA |
| ACm/ACp | LICENSE | UNIQUE TO LICENSE | LIMITATION INFORMATION LIMITATIONS ON REPRODUCTION AND HANDLING LICENSE |
| CONTENT ID | LICENSE | UNIQUE TO CONTENT | ADMINISTRATION CODE FOR SPECIFYING CONTENT |
| LICENSE ID | LICENSE | UNIQUE TO LICENSE | ADMINISTRATION CODE FOR SPECIFYING LICENSE |
| LICENSE | LICENSE | UNIQUE TO LICENSE | GENERIC TERM FOR Kc+ACm+ACp+CONTENT ID+LICENSE ID |

FIG.3

| ACm | Play_c | REPRODUCTION COUNT<br>NUMBER OF TIMES Kc CAN BE OUTPUT TO CONTENT REPRODUCTION CIRCUIT<br>(0: REPRODUCTION DISABLED/1-254: ALLOWABLE OUTPUT COUNT/255: UNLIMITED) |
|---|---|---|
| | CCI | COPY CONTROL<br>INFORMATION ABOUT COPY/TRANSFER TO ANOTHER APPARATUS<br>(0: COPY PERMITTED/1: FIRST GENERATION COPY PERMITTED/2: COPY DISABLED<br>TRANSFER PERMITTED/3: TRANSFER COPY DISABLED) |
| ACp | Valid_t | HOLD TIME<br>AVAILABLE TIME OF Kc IN CONTENT REPRODUCTION CIRCUIT<br>(0: NO LIMIT/1-255: ALLOWABLE HOLD TIME (UNITS OF MINUTE)) |

FIG.4

| | | SYMBOL | TYPE | ATTRIBUTE | CHARACTERISTICS |
|---|---|---|---|---|---|
| DISTRIBUTION SERVER | | KPa | PUBLIC AUTHENTICATION KEY | COMMON TO SYSTEM | KEY FOR DECRYPTING AUTHENTICATION DATA AT CERTIFICATE AUTHORITY |
| | | Ks1 | SYMMETRIC KEY | UNIQUE TO SESSION | GENERATED FOR EVERY DISTRIBUTION OF LICENSE TO MEMORY CARD |
| MEMORY CARD | | KPa | PUBLIC AUTHENTICATION KEY | COMMON TO SYSTEM | KEY FOR DECRYPTING AUTHENTICATION DATA AT CERTIFICATE AUTHORITY IDENTICAL WITH KPa OF DISTRIBUTION SERVER |
| | | KPmw | PUBLIC ENCRYPTION KEY | UNIQUE TO CLASS | HELD AS AUTHENTICATION DATA ENCRYPTED AT CERTIFICATE AUTHORITY ALONG WITH CERTIFICATE Cmw w IS IDENTIFIER FOR IDENTIFYING CLASS |
| | | Kmw | PRIVATE DECRYPTION KEY | UNIQUE TO CLASS | ASYMMETRIC DECRYPTION KEY FOR DECRYPTING DATA ENCRYPTED BY PUBLIC ENCRYPTION KEY KPmw |
| | | KPmcx | PUBLIC ENCRYPTION KEY | INDIVIDUAL | DIFFER FOR EACH MEMORY x IS IDENTIFIER FOR IDENTIFYING MODULE |
| | | Kmcx | PRIVATE DECRYPTION KEY | INDIVIDUAL | ASYMMETRIC DECRYPTION KEY FOR DECRYPTING DATA ENCRYPTED BY PUBLIC ENCRYPTION KEY KPmcx |
| | | Ks2 | SYMMETRIC KEY | UNIQUE TO SESSION | GENERATED FOR EVERY TRANSFER OF LICENSE BETWEEN DISTRIBUTION SERVER AND MUSIC REPRODUCTION MODULE |
| | | Cmw | CERTIFICATE | CLASS CERTIFICATE | CLASS CERTIFICATE OF MEMORY CARD. WITH AUTHENTICATION FUNCTION. RECORDED AT THE TIME OF SHIPEMENT IN THE FORM OF; [KPmw//Cmw]KPa * DIFFERENT FOR EACH CLASS w OF MEMORY CARD |
| CONTENT REPRODUCTION DEVICE | | KPpy | PUBLIC ENCRYPTION KEY | UNIQUE TO CLASS | HELD AS AUTHENTICATION DATA ENCRYPTED AT CERTIFICATE AUTHORITY ALONG WITH CERTIFICATE Cmw y IS IDENTIFIER FOR IDENTIFYING CLASS |
| | | Kpy | PRIVATE DECRYPTION KEY | UNIQUE TO CLASS | ASYMMETRIC DECRYPTION KEY FOR DECRYPTING DATA ENCRYPTED BY PUBLIC ENCRYPTION KEY KPpy |
| | | Ks3 | SYMMETRIC KEY | UNIQUE TO SESSION | GENERATED FOR EVERY REPRODUCTION SESSION BETWEEN DISTRIBUTION SERVER AND MUSIC REPRODUCTION MODULE |
| | | Cpay | CERTIFICATE | CLASS CERTIFICATE | CLASS CERTIFICATE OF CONTENT REPRODUCTION DEVICE. WITH AUTHENTICATION FUNCTION. RECORDED AT THE TIME OF SHIPMENT IN THE FORM OF [KPpy//Cpay]KPa * DIFFERENT FOR EACH CLASS y OF CONTENT REPRODUCTION DEVICE |

DATA REPRODUCTION APPARATUS CAPABLE OF SAFELY CONTROLLING REPRODUCTION TIME OF ENCRYPTED CONTENT DATA AND DATA REPRODUCTION CIRCUIT AND DATA RECORDING APPARATUS USED FOR THE SAME

BACKGROUND OF THE INVENTION

1. Field of the Invention

The present invention relates to a data reproduction apparatus capable of controlling a reproduction time of encrypted data as a whole in decrypting and reproducing encrypted data obtained using a data distribution system that allows copyright protection for copied information, a data reproduction circuit for use therein, and a data recording apparatus.

2. Description of Related Art

By virtue of the progress in digital information communication networks and the like such as the Internet in these few years, each user can now easily access network information through individual-oriented terminals employing a mobile phone or the like.

In such digital information communication networks, information is transmitted through digital signals. It is now possible to obtain copied music data and video data transmitted via the aforementioned information communication network without degradation in the audio quality and picture quality of the copied information, even in the case where the copying operation is performed by an individual user.

Thus, there is a possibility of the copyright of the copyright owner being significantly infringed unless some appropriate measures to protect copyrights are taken when contents subject to copyright protection such as music and image data are to be transmitted on the digital information communication network.

However, if copyright protection is given top priority so that distribution of content data through the disseminating digital information communication network is suppressed, the copyright owner who can essentially collect a predetermined copyright royalty for copies of a copyrighted data will also incur some disbenefit.

To take an example of a recording medium with digital data recorded thereon, in stead of the distribution via a digital information communication network as described above, music data can be copied basically freely from a CD (compact disk) with commercially available music data recorded thereon to a magneto-optical disk (MD or the like) as long as the copied music is limited to private use. A private user who carries out digital recording or the like is supposed to indirectly pay a copy right owner a certain amount of the cost for a digital recorder itself, MD or the like as a deposit.

In view of the fact that music data copied from CD to MD is digital data that is hardly degraded when copied, a recording apparatus is configured to prohibit music data from being copied from a recordable MD to another MD as digital data for the purpose of copy right protection.

In this state of affairs, sufficient measures must be taken in distributing content data such as music and image data to the public through the digital information communication network for the purpose of copyright protection since distribution per se is an act subject to restriction based on the copyright owner's right of transmission to the public.

It is also necessary to prevent any unauthorized user from receiving content data transmitted to the public through a digital information communication network, as well as preventing any content data, once received by an authorized user, to be further copied without permission.

In view of the foregoing, a data distribution system through a digital communication network is proposed in which a distribution server storing encrypted content data that is an encrypted version of content data distributes the encrypted content data via a terminal device such as a mobile phone to a memory card loaded to the terminal device. In this data distribution system, a public encryption key of a memory card authenticated in advance by a certificate authority and a certificate thereof are transmitted to the distribution server when distribution of encrypted content data is requested. Upon confirming reception of the authorized certificate by the distribution server, the encrypted content data as well as the license key required to decrypt the encrypted content data are transmitted to the memory card. When the encrypted content data and the license key are transmitted, the distribution server and the memory card respectively generate session keys different from distribution to another distribution and encrypt public encryption keys using the generated session keys to exchange the keys between the distribution server and the memory card.

Eventually, the distribution server transmits to the memory card the license encrypted by an individual public encryption key for each memory card and further encrypted by the session key as well as encrypted content data. The memory card then records the received license key and encrypted content data into a memory.

To reproduce the encrypted content data recorded in the memory card, the user loads the memory card to a reproduction terminal with a dedicated reproduction circuit to reproduce the encrypted content data for enjoyment.

In such a system, a usage regulation provided to allow content suppliers or copyright owners to direct the usage for reproduction and copy of encrypted content data is distributed with a license key so that each apparatus can carry out processes according to the usage regulation.

The usage regulation includes a regulation for copy/transfer of licenses between memory cards, a regulation such as a limitation on the reproduction number of times when a license key is output from a memory card, and a regulation for handling reproduced content data.

The conventional system, however, is disadvantageous in that a safety operation is not ensured by defining a reproduction time as the usage regulation.

In other words, even if a reproduction time is defined as the usage regulation for handling reproduced content data, the operation does not work unless the regulation for a reproduction time recorded in a memory card keeps updated. Even if the system is configured to provide an updating instruction from a reproduction terminal to a memory card, the regulation for the reproduction time can be easily violated by interfering with transmittance of the updating instruction from the reproduction terminal to the memory card.

SUMMARY OF THE INVENTION

An object of the present invention is therefore to provide a data reproduction apparatus capable of safely controlling a reproduction time of encrypted content data.

Another object of the present invention is to provide a data reproduction circuit for use in a data reproduction apparatus capable of safely controlling a reproduction time of encrypted content data.

A further object of the present invention is to provide a data recording apparatus corresponding to a data reproduction apparatus capable of safely controlling a reproduction time of encrypted content data.

In accordance with the present invention, a data reproduction apparatus decrypts and reproduces encrypted content data of which reproduction is defined by first reproduction control information that specifies an allowable retrieval count of a license key for decrypting encrypted content data from a data recording apparatus for reproduction and second reproduction control information that specifies an allowable hold time of the retrieved license key. The data reproduction apparatus includes: an interface controlling data transfer from/to the data recording apparatus; content reproduction means decrypting and reproducing the encrypted content data using the license key; key operation means inputting an instruction; control means; and a timer unit notifying the control means of passage of time. The control means obtains the encrypted content data, the license key and the second reproduction control information from the data recording apparatus via the interface in response to a reproduction request for the encrypted content data that is input via the key operation means, applies the obtained license key and encrypted content data to the content reproduction means, discards the license key applied to the content reproduction means when an elapsed time after application of the license key to the content reproduction means reaches the allowable hold time specified by the second reproduction control information, and obtains again the license key and the second reproduction control information from the data recording apparatus for application to the content reproduction means at a timing that allows the encrypted content data to be reproduced continuously.

Preferably, upon starting to use the license key, the control means performs on the timer unit a timer setting of the allowable hold time specified by the second reproduction control information, and the timer unit notifies the control means when the allowable hold time has expired after the timer setting.

Preferably, the control means obtains the encrypted content data per block from the data recording apparatus for application to the content reproduction means, and determines whether or not the elapsed time reaches the allowable hold time every time the encrypted content data included in one block is applied to the content reproduction means.

Preferably, when it is determined that the elapsed time reaches the allowable hold time, the control means discards the license key applied to the content reproduction means and newly obtains the license key from the data recording apparatus via the interface.

Preferably, the control means newly obtains, before the elapsed time reaches the allowable hold time, the license key from the data recording apparatus via the interface, and discards, when the elapsed time reaches the allowable hold time, the license key applied to the content reproduction means, and applies the newly obtained license key to the content reproduction means.

Preferably, when it is determined that the elapsed time does not reach the allowable hold time, the control means obtains a next block from the data recording apparatus via the interface and applies the obtained next block to the content reproduction means.

In accordance with the present invention, a data reproduction apparatus decrypts and reproduces encrypted content data of which reproduction is defined by first reproduction control information that specifies an allowable retrieval count of a license key for decrypting encrypted content data from a data recording apparatus for reproduction and second reproduction control information that specifies an allowable hold time of the retrieved license key. The data reproduction apparatus includes: an interface controlling data transfer to/from the data recording apparatus; content reproduction means decrypting and reproducing the encrypted content data using the license key; key operation means inputting an instruction; and control means. The content reproduction means includes: a content decryption unit decrypting the encrypted content data using the license key; a reproduction control unit controlling a reproduction process of the encrypted content data; and a timer unit notifying the reproduction control unit of passage of time. The control means obtains the encrypted content data, the license key and the second reproduction control information from the data recording apparatus via the interface in response to a reproduction request for the encrypted content data that is input via the key operation means, applies the obtained license key, encrypted content data and second reproduction control information to the content reproduction means, and obtains again the license key and the second reproduction control information from the data recording apparatus for application to the content reproduction means in response to an instruction to obtain the license key from the reproduction control unit. The reproduction control unit supplies the applied encrypted content data and license key to the content decryption unit, discards the license key supplied to the content decryption unit when an elapsed time after starting to use the license key in the content decryption unit reaches the allowable hold time specified by the second reproduction control information, and instructs the control means to obtain again the license key from the data recording apparatus at a timing that allows the encrypted content data to be reproduced continuously.

Preferably, upon starting to use the license key, the reproduction control unit performs on the timer unit a timer setting of the allowable hold time specified by the second reproduction control information, and the timer unit notifies the reproduction control unit when the allowable hold time has expired after the timer setting.

Preferably, the control means obtains the encrypted content data per block from the data recording apparatus for application to the content reproduction means, and the reproduction control unit determines whether or not the elapsed time reaches the allowable hold time every time reproduction of encrypted content data included in one block is completed.

Preferably, when it is determined that the elapsed time reaches the allowable hold time, the reproduction control unit discards the license key applied to the content decryption unit and outputs a request to reobtain the license key to the control means, and the control means obtains the license key and the second reproduction control information from the data recording apparatus via the interface in response to the request to reobtain, and applies the obtained license key and second reproduction control information to the content reproduction means.

Preferably, the reproduction control unit outputs, before the elapsed time reaches the allowable hold time, the request to reobtain the license key to the control means, and discards, when the elapsed time reaches the allowable hold time, the license key applied to the content decryption unit, and the control means obtains the license key and the second reproduction control information from the data recording apparatus via the interface in response to the request to reobtain, and applies the obtained license key and second reproduction control information to the content reproduction means.

Preferably, when it is determined that the elapsed time does not reach the allowable hold time, the reproduction control unit outputs a request to obtain a next block to the control means, and the control means obtains the next block from the data recording apparatus via the interface for application to the content reproduction means in response to the request to obtain.

Preferably, the data reproduction apparatus further includes a certificate hold unit holding a certificate for the data recording apparatus. The control means transmits the certificate to the data recording apparatus via the interface in response to the reproduction request, and receives the encrypted content data, the license key and the second reproduction control information from the data recording apparatus via the interface when the certificate is authenticated in the data recording apparatus.

Preferably, the certificate includes a public key that is unique to the data reproduction apparatus and uniquely corresponds to the certificate itself. The data reproduction apparatus further includes: private key hold means holding a private key for decrypting data encrypted by the public key; first decryption processing means decrypting the data encrypted by the public key using the private key; session key generation means generating a first session key for identifying communication with the data recording apparatus; encryption processing means encrypting data using a second session key generated in the data recording apparatus; and second decryption processing means decrypting data encrypted by the first session key. When the license key and the second reproduction control information are obtained from the data recording apparatus, the session key generation means generates the first session key, the first decryption processing means decrypts the second session key encrypted by the public key using the public key, the encryption processing means encrypts the first session key using the second session key obtained by the first decryption processing means, the control means applies to the first decryption processing means the second session key encrypted by the public key received from the data recording apparatus via the interface, transmits the first session key encrypted by the second session key to the data recording apparatus via the interface, and applies to the second decryption processing means the license key and the second reproduction control information encrypted by the first session key received from the data recording apparatus via the interface, and the second decryption processing means decrypts the license key and the second reproduction control information encrypted by the first session key using the first session key, and applies the decrypted license key and second reproduction control information to the content reproduction means.

In accordance with the present invention, a data reproduction circuit is included in a data reproduction apparatus decrypting and reproducing encrypted content data of which reproduction is defined by first reproduction control information that specifies an allowable retrieval count of a license key for decrypting encrypted content data from a data recording apparatus for reproduction and second reproduction control information that specifies an allowable hold time of the retrieved license key. The data reproduction circuit includes: a content decryption unit decrypting the encrypted content data using the license key; a reproduction control unit controlling a reproduction process of the encrypted content data; and a timer unit notifying the reproduction control unit of passage of time. The reproduction control unit supplies externally applied encrypted content data and license key to the content decryption unit, discards the license key supplied to the content decryption unit when an elapsed time after starting to use the license key in the content decryption unit reaches the allowable hold time specified by the second reproduction control information externally applied along with the license key, and externally outputs an instruction to obtain the license key from the data recording apparatus at a timing that allows the encrypted content data to be reproduced continuously.

Preferably, the data reproduction circuit further includes a certificate hold unit holding a certificate unique to the data reproduction circuit for the data recording apparatus. The certificate hold unit externally outputs the certificate to obtain the license key and the second reproduction control information from the data recording apparatus. The reproduction control unit receives the license and the second reproduction control information from the data recording apparatus when the certificate is authenticated in the data recording apparatus.

Preferably, the certificate includes a public key that is unique to the data reproduction circuit and uniquely corresponds to the certificate itself. The data reproduction circuit further includes: private key hold means holding a private key for decrypting data encrypted by the public key; first decryption processing means decrypting the data encrypted by the public key using the private key; session key generation means generating a first session key for identifying a process of obtaining the license key from the data recording apparatus; encryption processing means encrypting data using a second session key generated in the data recording apparatus; and second decryption processing means decrypting data encrypted by the first session key. When the license key and the second reproduction control information are obtained from the data recording apparatus, the session key generation means generates the first session key, the first decryption processing means decrypts the second session key encrypted by the public key using the public key, the encryption processing means encrypts the first session key using the second session key obtained by the first decryption processing means, the reproduction control units applies the second session key encrypted by the externally received public key to the first decryption processing means, externally outputs the first session key encrypted by the second session key, and applies the license key and the second reproduction control information encrypted by the first session key to the second decryption processing means, and the second decryption processing means decrypts the license key and the second reproduction control information encrypted by the first session key in the data recording apparatus using the first session key, and applies the decrypted license key and second reproduction control information to the reproduction control unit.

In accordance with the present invention, a data recording apparatus records a license key, first reproduction control information and second reproduction control information for encrypted content data of which reproduction is defined by the first reproduction control information that specifies an allowable output count of the license key for decrypting encrypted content data to be output to a data reproduction apparatus and the second reproduction control information that specifies an allowable hold time of the output license key in the data reproduction apparatus. The data recording apparatus includes: storage means storing the license key, the first reproduction control information and the second reproduction control information; an interface for data transfer to/from the data reproduction apparatus; and control means. The control means reads the first reproduction control information from the storage means in response to an output request for the license key that is input via the interface to determine whether or not an output count of the license key exceeds the allowable output count specified by the read first reproduction control information, and, when the output count does not exceed the allowable output count, subtracts from and updates the allowable output count and performs a reproduction permission process of outputting the license key and the second reproduction control information read from the storage means to the data reproduction apparatus via the interface.

Preferably, the data recording apparatus further includes another storage means storing the encrypted content data. The control means further reads the encrypted content data from another storage means and outputs the read encrypted content data to the data reproduction apparatus via the interface.

Preferably, the data recording apparatus further includes decryption processing means decrypting encrypted data encrypted by a public authentication key using the public authentication key. The control means receives a certificate encrypted by the public authentication key from the data reproduction apparatus via the interface, applies the encrypted certificate to the decryption processing means, and receives the certificate decrypted by the decryption processing means.

Preferably, the data recording apparatus further includes: session key generation means generating a session key for identifying communication with the data reproduction apparatus; and encryption processing means encrypting data using a public encryption key that is unique to the data reproduction apparatus and uniquely corresponds to the certificate. When the certificate is accepted, the session key generation means generates a first session key for identifying communication with the data reproduction apparatus, the encryption processing means encrypts the first session key using the public encryption key, and the control means outputs the encrypted first session key to the data reproduction apparatus via the interface.

Preferably, the data recording apparatus further includes: another decryption processing means decrypting encrypted data encrypted by the session key; and another encryption processing means encrypting data using the session key. In the reproduction permission process, the control means receives via the interface encrypted data created by encrypting a second session key generated in the data reproduction apparatus using the first session key, applies the encrypted data to another decryption processing means, applies the license key and the second reproduction control information read from the storage means to another encryption processing means, and outputs the license key and the second reproduction control information encrypted by the second session key to the data reproduction apparatus via the interface, another decryption processing means decrypts the encrypted data using the first session key for application to another encryption processing means, and another encryption processing means encrypts the license key and the second reproduction control information using the second session key obtained by another decryption processing means.

Therefore, in accordance with the present invention, the entire reproduction time of encrypted content data can be defined by the number of times×the hold time by controlling the number of times a license key can be output from the memory card to the content reproduction circuit and the hold time at a time of the license key in the content reproduction circuit.

BRIEF DESCRIPTION OF THE DRAWINGS

FIG. 2 represents the characteristics of data, information and the like for communication in the data distribution system shown in FIG. 1.

FIG. 3 represents the contents of access control information and reproduction control information shown in FIG. 2.

FIG. 4 represents the characteristics of data, information and the like for authentication in the data distribution system shown in FIG. 1.

DETAILED DESCRIPTION OF THE INVENTION

Figure 1:
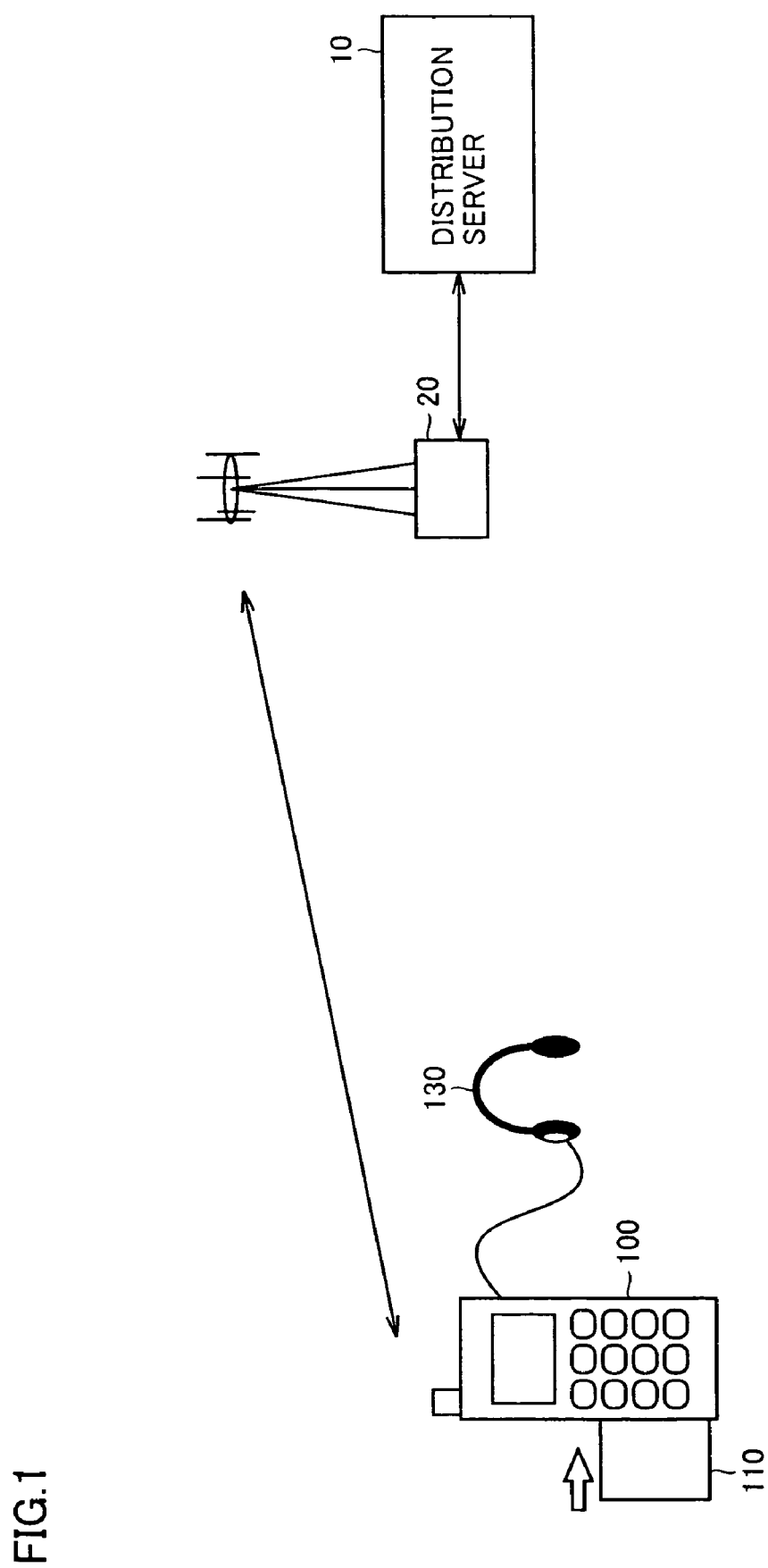
FIG. 1 is a schematic diagram conceptually illustrating a data distribution system.

An embodiment of the present invention will be described in detail with reference to the figures. It is noted that in the figures the same or corresponding parts will be denoted with the same reference characters and the description thereof will not be repeated.

FIG. 1 is a schematic diagram conceptually illustrating the entire configuration of a data distribution system for a data recording apparatus in accordance with the present invention to obtain encrypted content data and a license for decrypting the encrypted content data.

Description will be provided hereinafter based on an exemplary configuration of the data distribution system in which music data is distributed to user's mobile phone 100 via a mobile phone network, is stored in a memory card 110 loaded onto mobile phone 100, and is then reproduced by a dedicated reproduction circuit (not shown) contained in mobile phone 100. However, as will be clearly understood from the following description, the present invention is not limited to such a case, and is applicable to any application that distributes content data of other copyrights such as image data, motion picture data, and the like.

Referring to FIG. 1, a distribution carrier 20 relays to a distribution server 10 a user's distribution request received through its mobile phone network. Distribution server 10 administrating music data performs an authentication process as to whether memory card 110 loaded on mobile phone 100 of a mobile phone user who accesses for data distribution has a valid authentication data, i.e., whether the memory card is authorized or not, and supplies, for the valid memory card, a mobile phone company as distribution carrier 20 for distributing data with music data (referred to as content data hereinafter) as encrypted according to a prescribed encryption technique for the purpose of copyright protection as well as a license including a license key for decrypting the encrypted content data as information required to reproduce the encrypted content data.

Distribution carrier 20 distributes the encrypted content data and the license, via the mobile phone network and mobile phone 100, to memory card 110 loaded onto mobile phone 100 that has transmitted a distribution request via its mobile phone network.

In FIG. 1, for example, mobile phone 100 of the mobile phone user is configured to be loaded with detachable memory card 110. Memory card 110 receives the encrypted content data received by mobile phone 100, decrypts the encryption that has been carried out for copyright protection, and then provides the decrypted content data to a dedicated music reproduction circuit included in mobile phone 100.

The mobile phone user can use a headphone 130 or the like connected to mobile phone 100 to "reproduce" such content data for audio reception.

With such a configuration, it becomes difficult to receive distributed content data from distribution server 10 to reproduce music unless memory card 110 is used.

In addition, distribution carrier 20 may count the number of times content data of one song is distributed to collect a copyright royalty generated for each reception (download) of content data by a mobile phone user along with a call charge for the mobile phone, so that a copyright owner can easily secure the copyright royalty.

Therefore, in the data distribution system shown in FIG. 1, memory card 110 loaded onto mobile phone 100 can receive the encrypted content data and the license from distribution server 10 via the mobile phone network.

In the configuration shown in FIG. 1, the system requirements to allow distributed encrypted content data to be reproduced at the end of mobile phone users includes: (1) a scheme to distribute a license in communication; (2) a scheme itself to encrypt content data; and (3) a configuration to realize copyright protection to prevent illegal copy and use of content data in such a reproducible state.

The embodiment of the present invention will be described based on a configuration that enhances copyright protection of content data, particularly in each of distribution and reproduction processes, by enhancing an authentication and checking function on a receiver of a license required to reproduce such encrypted content data and by preventing a license from being output to unauthorized recording apparatus and data reproduction terminal (which is a generic term used to refer to a terminal including a dedicated content reproduction circuit that can decrypt and reproduce encrypted content data. Therefore, a mobile phone with a content reproduction circuit is included in the data reproduction terminal. The mobile phone described hereinafter corresponds to the data reproduction terminal.)

In the following description, a process of transmitting encrypted content data or a license thereof from distribution server 10 to each mobile phone is referred to as "distribution".

FIG. 2 represents the characteristics of data, information and the like for communication for use in the data distribution system shown in FIG. 1.

Data distributed from distribution sever 10 will first be described. Dc represents content data such as music data. Content data Dc is subjected to encryption that can be decrypted using a license key Kc. Encrypted content data {Dc} Kc that has been subjected to encryption that can be decrypted using license key Kc is distributed to the user of mobile phone 100 by distribution server 10 in this form.

In the following, the representation of {Y} X implies that data Y has been subjected to encryption that can be decrypted by a decryption key X.

Together with the encrypted content data, distributed from distribution server 10 is additional information Dc-inf as plaintext information associated with the copyright for that content data or a server access. A license includes license key Kc and a license ID as an administration code for specifying distribution of a license key and the like from distribution server 10, which are exchanged between distribution server 10 and mobile phone 100.

The license further includes a content ID that is a code for identifying content data Dc, as well as access control information ACm that is information about a limitation on access to the license in the recording apparatus (memory card) and reproduction control information ACp that is control information about reproduction in the content reproduction circuit in the data reproduction terminal. The control information ACm and ACp is created based on a license purchase condition AC including information such as the number of licenses as determined by user's designation and functional limitations.

Specifically, access control information ACm is control information for outputting a license or a license key from the memory card to an external source, including a reproducible number of times (the number of times the license key is output for reproduction), information of limitations on license transfer/copy. As shown in FIG. 3, access control information ACm includes reproduction count Play_c and copy control information CCI. Reproduction count Play_c indicates the number of times that license key Kc recorded in memory card 110 can be output to the content reproduction circuit contained in mobile phone 100. Copy control information CCI is control information including any one of copy permitted, a first generation copy permitted, copy disabled and transfer permitted, and transfer and copy disabled.

Reproduction control information ACp is information to restrict reproduction after the content reproduction circuit receives the license key to reproduce encrypted content data. Reproduction control information ACp includes hold time Valid_t. Hold time Valid_t is one-byte control information in which "0" or "1"-"255" is set. When "0" is set, there is no limitation on the usage time of license key Kc output to the content reproduction circuit for reproduction. When a value other than "0" is set, there is a limitation on the usage time of license key Kc output to the content reproduction circuit for reproduction and that value indicates the usable time. More specifically, when the value of "1"-"255" is set as a hold time Valid_t, license key Kc output to the content reproduction circuit is automatically discarded in the content reproduction circuit when the time set in hold time Valid_t has expired after license key Kc is used to reproduce the content data. It is assumed that the value set in hold time Valid_t represents the time period in units of minute, except for "0".

In the present invention, the number of times license key Kc is output from memory card 110 is controlled by reproduction count Play_c, and the usable time per count of license key Kc in the content reproduction circuit is controlled by hold time Valid_t. A reproducible time of encrypted content data {Dc} Kc is defined by Play_c×Valid_t. Therefore, the accuracy in controlling the reproducible time depends on hold time Valid_t.

In the following, for the sake of simplification, it is assumed that access control information ACm includes two items of reproduction count Play_c (0: reproduction disabled; 1 to 254: reproducible counts; 255: no limitation) and copy control information CCI (0: copy permitted; 1: a first generation copy permitted; 2: copy disabled and transfer permitted; 3: transfer and copy disabled). Reproduction control information ACp includes one item of hold time Valid_t (0: no limitation; 1 to 255: allowable hold time).

Referring again to FIG. 2, license ID, content ID, license key Kc, access control information ACm, and reproduction control information ACp will be generically referred together as "license" hereinafter.

FIG. 4 represents the characteristics of data, information and the like for authentication for use in the data distribution system shown in FIG. 1.

The content reproduction device in the data reproduction terminal and the memory card are provided with unique public encryption keys KPpy and KPmw, respectively. Public encryption keys KPpy and KPmw can be decrypted by a private decryption key Kpy unique to the content reproduction circuit and a private decryption key Kmw unique to the memory card, respectively. These public encryption key and private decryption key have a different value for every type of memory cards. These public encryption key and private decryption key are generically referred to as a class key. The public encryption key is called a class public encryption key, and the private decryption key is called a class private decryption key. The common unit sharing the same class key is referred to as class. The class differs depending on the manufacture company, the type of product, the production lot, and the like.

A class certificate Cpay is provided for a content reproduction circuit, and a class certificate Cmw is provided for a memory card. These class certificates have different information for each class of a content reproduction circuit and a memory card.

The class public encryption key and class certificate of a content reproduction circuit is recorded in the content reproduction circuit at the time of shipment in the form of authentication data {KPpy//Cpay}KPa. The class public encryption key and class certificate of a memory card is recorded in the memory card at the time of shipment in the form of authentication data {KPmw//Cmw} KPa. As will be described in detail below, KPa is a public authentication key common to the entire distribution system.

As keys to administer data processing in memory card 110, a public encryption key KPmcx set for each medium such as a memory card, and private decryption key Kmcx that can decrypt data encrypted by public encryption key KPmcx are present. These public encryption key and private decryption key set for each memory card is generically referred to as "an individual key". Public encryption key KPmcx is called an individual public encryption key. Private decryption key Kmcx is called an individual private encryption key.

Symmetric keys Ks1 to Ks3 generated at distribution server 10, mobile phone 100 and memory card 110 for every license distribution and reproduction are used.

These symmetric keys Ks1-Ks3 are unique symmetric keys generated for each "session", which is the communication unit or access unit among the distribution server, the content reproduction circuit and the memory card. These symmetric keys Ks1-Ks3 are also referred to as "session key" hereinafter.

These session keys Ks1-Ks3 are under control of the distribution server, the content reproduction circuit and the memory card by having a value unique to each session. Specifically, session key Ks1 is generated by the distribution server for every distribution session. Session key Ks2 is generated by the memory card for each of the distribution session, the copy/transfer session for copying or transferring a license between memory cards and a reproduction permission session for outputting a license to the content reproduction circuit. Session key Ks3 is generated by the content reproduction circuit for every reproduction permission session. By transferring these session keys in respective sessions to receive session keys generated at other party apparatus for encryption, followed by transmission of a license key or the like, the security during a session can be improved.

Figure 5:
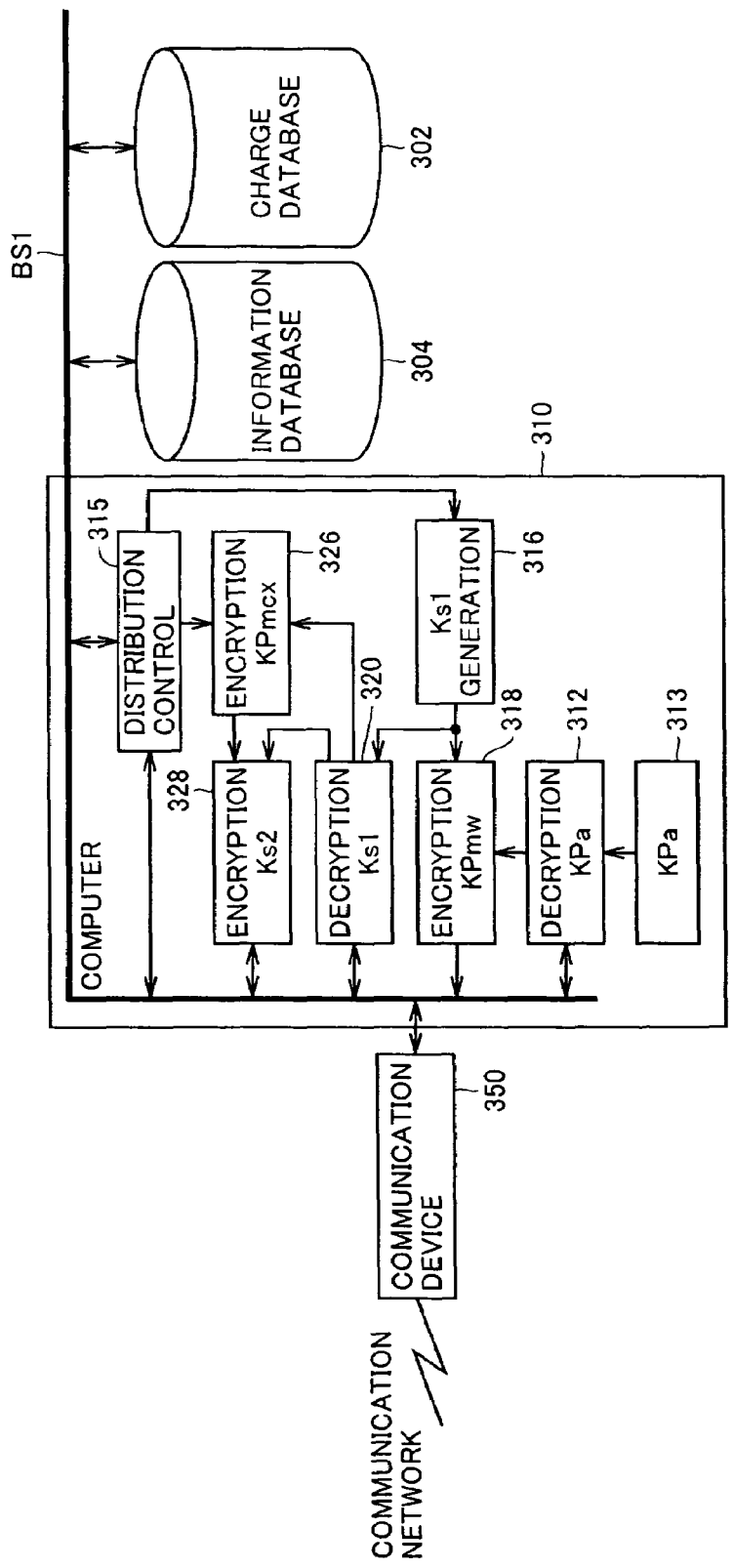
FIG. 5 is a schematic block diagram showing a configuration of a distribution server in the data distribution system shown in FIG. 1.

FIG. 5 is a schematic block diagram showing a configuration of distribution server 10 shown in FIG. 1.

Distribution server 10 includes an information database 304 to store content data encrypted according to a predetermined method as well as distribution information such as content ID, an account database 302 to store accounting information according to initiating access to content data for each mobile phone user, a data processing unit 310 receiving via a bus BS1 data from information database 304 and account database 302 to carry out a predetermined process, and a communication device 350 to transfer data between distribution carrier 20 and data processing unit 310 via a communication network.

Data processing unit 310 includes a distribution control unit 315 to control the operation of data processing unit 310, a session key generation unit 316 under control of distribution control unit 315 to generate session key Ks1 in a distribution session, an authentication key hold unit 313 holding a public authentication key KPa for decrypting authentication data {KPmw//Cmw} KPa for authentication sent from the memory card, a decryption processing unit 312 receiving authentication data {KPmw//Cmw} KPa for authentication sent from the memory card via communication device 350 and bus BS1 to perform a decryption process using public authentication key KPa from authentication key hold unit 313, an encryption processing unit 318 encrypting session key Ks1 generated from session key generation unit 316 using class public encryption key KPmw obtained from decryption processing unit 312 for every distribution session to output the encrypted session key Ks1 onto bus BS1, and a decryption processing unit 320 receiving from bus BS1 the transmitted data encrypted by session key Ks1 to perform a decryption process.

Data processing unit 310 further includes an encryption processing unit 326 to encrypt license key Kc and access control information ACm provided by distribution control unit 315 using individual public encryption key KPmcx for each memory card obtained by decryption processing unit 320, and an encryption processing unit 328 further encrypting the output of encryption processing unit 326 using session key Ks2 applied from decryption processing unit 320 to output the further encrypted data onto bus BS1.

The operation of distribution server 10 in a distribution session will be described in detail later using a flow chart.

Figure 6:
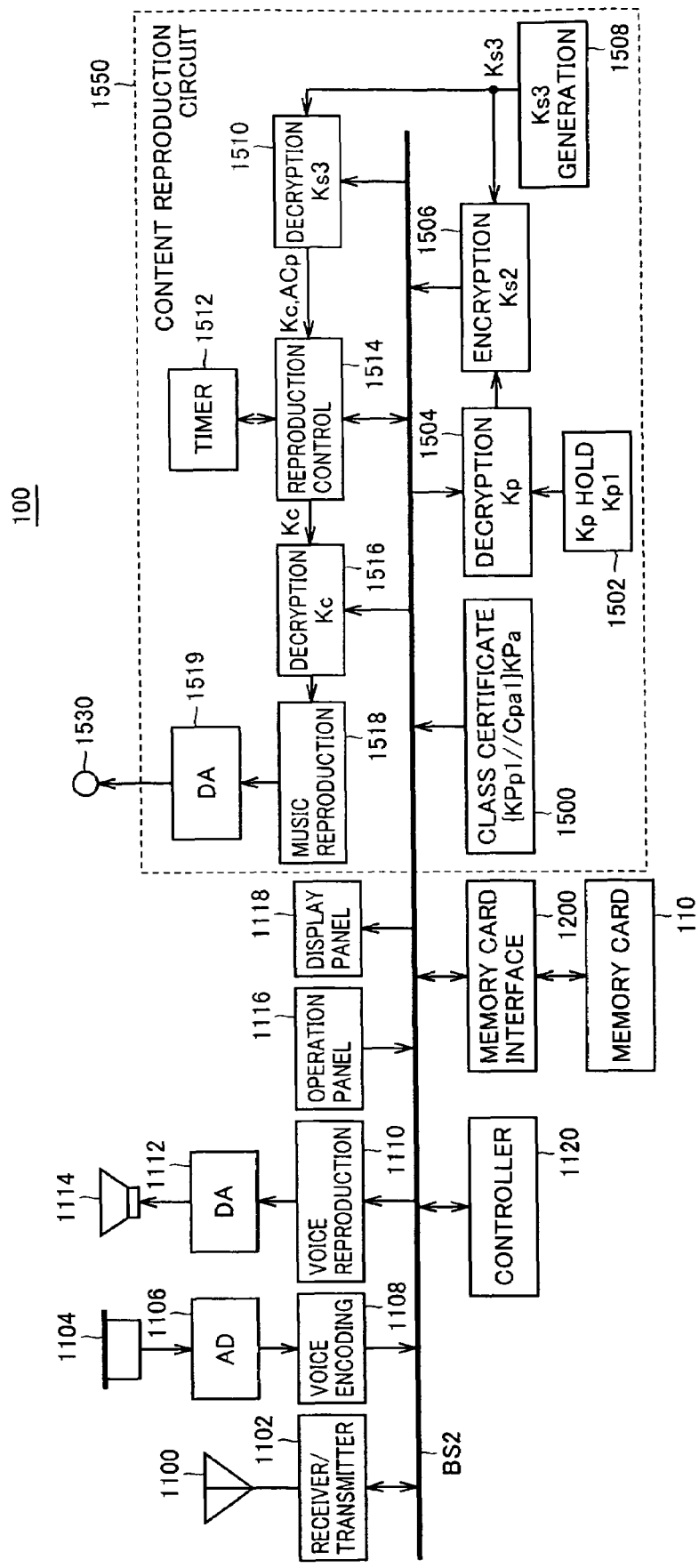
FIG. 6 is a schematic block diagram showing a configuration of a mobile phone in the data distribution system shown in FIG. 1.

FIG. 6 is a schematic block diagram illustrating a configuration of mobile phone 100 shown in FIG. 1.

Mobile phone 100 includes an antenna 1100 receiving signals transmitted through radio via a mobile phone network, a transmitter/receiver unit 1102 converting received signals from antenna 1100 to baseband signals, or modulating and providing data from mobile phone 100 to antenna 1100, and a bus BS2 to transfer data among the components in mobile phone 100.

Mobile phone 100 further includes a microphone 1104 taking in voice data of the user of mobile phone 100 and outputting the voice data to an AD converter unit 1106, AD converter unit 1106 converting the voice data from an analog signal to a digital signal, and a voice encoding unit 1108 encoding the voice signal converted to the digital signal into a prescribed format.

Mobile phone 100 further includes a voice reproduction unit 1110 decrypting a voice signal received from another mobile phone, a DA converter unit 1112 converting the voice signal from voice reproduction unit 1110 from a digital signal to an analog signal, and a speaker 1114 outputting the voice data to an external source.

Mobile phone 100 further includes an operation panel 1116 applying an instruction from an external source to mobile phone. 100, a display panel 1118 providing information output from controller 1120 and the like to the user as visual information, a controller 1120 controlling the operation of mobile phone 100 via bus BS2, and a memory card interface 1200 controlling data transfer between memory card 110 and bus BS2.

Mobile phone 100 further includes an authentication data hold unit 1500 holding authentication data {KPp1//Cpa1}KPa encrypted in a state in which its validity can be confirmed by decrypting class public encryption key KPp1 and class certificate Cpa1 using public authentication key KPa. Here, it is assumed that the class y of mobile phone 100 is y=1.

Mobile phone 100 further includes a Kp hold unit 1502 holding a decryption key Kp1 unique to each class, and a decryption processing unit 1504 decrypting the data received from bus BS2 using Kp1 to obtain session key Ks2 generated by memory card 110.

Mobile phone 100 further includes a session key generation unit 1508 generating by a random number or the like session key Ks3 required to encrypt data transferred to/from memory card 110 via bus BS2 in a reproduction permission session to reproduce content data stored in memory card 110, an encryption processing unit 1506 encrypting session key Ks3 generated by session key generation unit 1508 using session key Ks2 obtained from decryption processing unit 1504 to output the encrypted data onto bus BS2 during a reproduction session of the encrypted content data when license key Kc and reproduction control information ACp are received from memory card 110, a decryption processing unit 1510 decrypting the data on bus BS2 using session key Ks3 to output license key Kc and reproduction control information ACp, a timer 1512 outputting time information, and a reproduction control unit 1514 receiving license key Kc and reproduction control information ACp from decryption processing unit 1510 to control the supply of the received license key Kc to decryption processing unit 1516 based on the received reproduction control information ACp. Specifically, reproduction control unit 1514 determines whether or not there is a limitation on the usage time for the received license key Kc based on hold time Valid_t included in reproduction control information ACp. When there is no limitation, license key Kc is always supplied to decryption processing unit 1516 during reproduction. When there is a limitation, reproduction control unit 1514 uses timer 1512 to supply license key Kc to decryption processing unit 1516 when the elapsed time after the start of reproduction is within hold time Valid_t, and discard license key Kc immediately after the expiration of hold time Valid_t and output to controller 1120 a reproduction permission request to carry out a reproduction permission session in order to receive license key Kc again. The reproduction permission request may not be output immediately after the expiration of hold time Valid_t after the start of reproduction. Rather, the reproduction permission request may be output before the expiration of hold time Valid_t to receive, before discarding license key Kc, a license key Kc to be used after discarding the license key in order to carry out continuous reproduction.

Mobile phone 100 further includes a decryption processing unit 1516 receiving encrypted content data {Dc}Kc from bus BS2 to decrypt encrypted content data {Dc}Kc using license key Kc from reproduction control unit 1514 and output content data Dc to a music reproduction unit 1518, a music reproduction unit 1518 receiving the output from decryption processing unit 1516 to reproduce the content data, a DA converter unit 1519 converting the output of music reproduction unit 1518 from a digital signal to an analog signal, and a terminal 1530 outputting the output of DA converter unit 1519 to an external output device (not shown) such as a headphone.

In FIG. 6, the region encircled by the dotted line forms a content reproduction circuit 1550 that decrypts encrypted content data to reproduce music data. Content reproduction circuit 1550 is preferably a one-chip semiconductor device to improve the security. Furthermore, content reproduction circuit 1550 is preferably formed as a tamper-resistant module unsusceptible to external analysis.

The operation of the components of mobile phone 100 in each session will be described in detail later using a flow chart.

Figure 7:
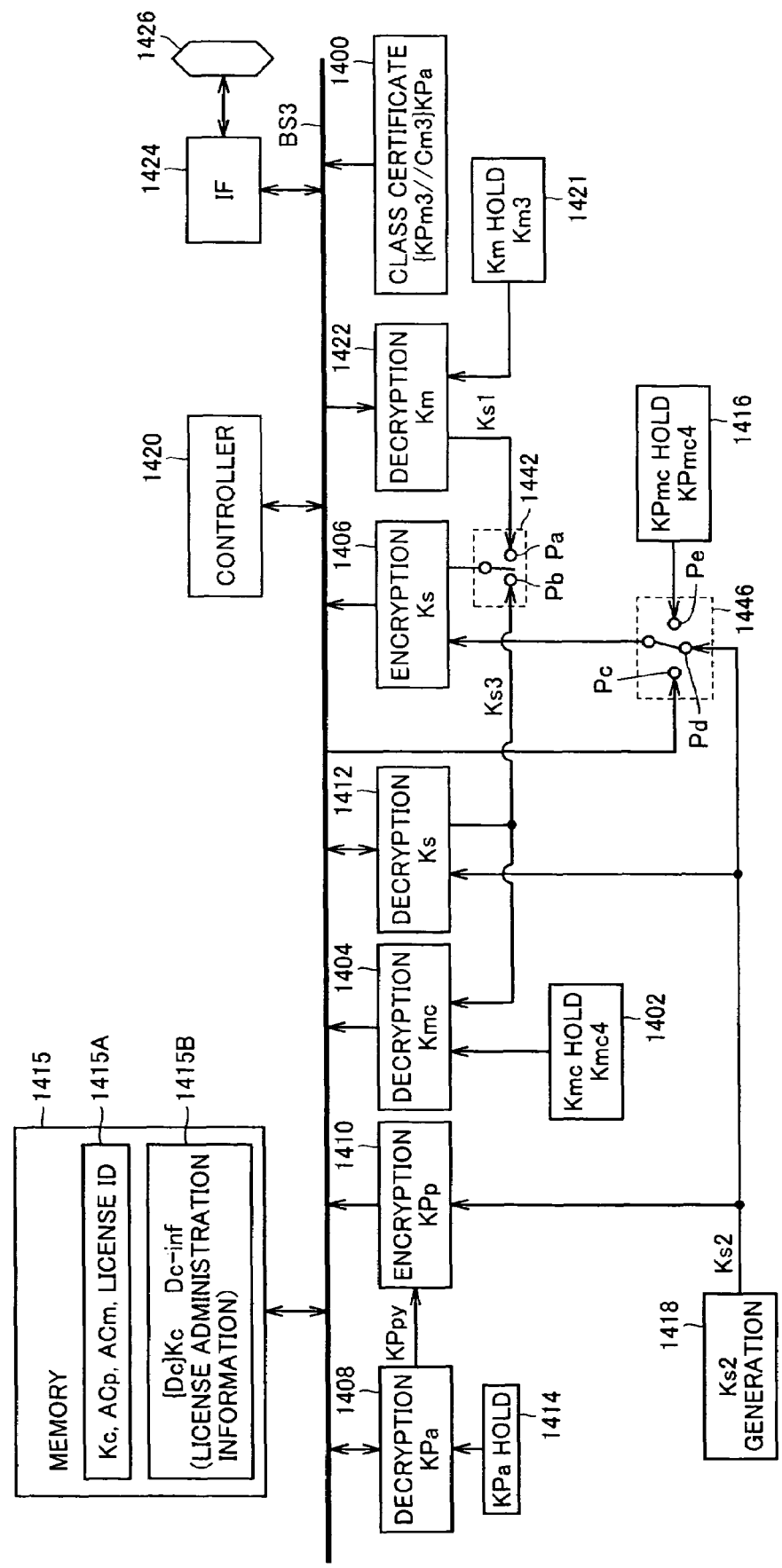
FIG. 7 is a schematic block diagram showing a configuration of a memory card in the data distribution system shown in FIG. 1.

FIG. 7 is a schematic block diagram illustrating a configuration of memory card 110 shown in FIG. 1.

As previously described, class public encryption key KPmw and class private decryption key Kmw are respectively provided for the memory card, and class certificate Cmw is provided for the memory card. It is assumed that, in memory card 110, a natural number w=3. Also, it is assumed that a natural number x identifying a memory card is represented as x=4.

Accordingly, memory card 110 includes an authentication data hold unit 1400 holding authentication data {KPm3//Cm3}KPa, a Kmc hold unit 1402 holding an individual private decryption key Kmc4 that is a unique decryption key set for each memory card, a Km hold unit 1421 holding a class private decryption key Km3, and a KPmc hold unit 1416 holding a public encryption key KPmc4 that can be decrypted using individual private decryption key Kmc4.

By providing an encryption key for a recording apparatus such as a memory card in this way, administration of the distributed content data and the encrypted license key can be executed by a memory card unit, as will be apparent in the following description.

Memory card 110 further includes an interface 1424 transferring a signal via a terminal 1426 to/from memory card interface 1200, a bus BS3 to transfer a signal to/from interface 1424, a decryption processing unit 1422 decrypting the data applied from interface 1424 onto bus BS3 using class private decryption key Km3 applied by Km hold unit 1421 and outputting to a contact Pa session key Ks1 generated by distribution server 10 in a distribution session, a decryption processing unit 1408 receiving public authentication key KPa from KPa hold unit 1414 to execute a decryption process on the data on bus BS3 using public authentication key KPa and output the decryption result and the obtained class certificate to controller 1420 and the obtained class public key to an encryption processing unit 1410, and an encryption processing unit 1406 encrypting data selectively applied by a switch 1446 using a key selectively applied by a switch 1442 to output the encrypted data onto bus BS3.

Memory card 110 further includes a session key generation unit 1418 generating session key Ks2 in each of distribution and reproduction sessions, an encryption processing unit 1410 encrypting session key Ks2 output by session key generation unit 1418 using class public encryption key KPpy obtained from decryption processing unit 1408 to output the encrypted session key onto bus BS3, and a decryption processing unit 1412 receiving the data encrypted by session key Ks2 from bus BS3 to decrypt the encrypted data using session key Ks2 obtained from session key generation unit 1418.

Memory card 110 further includes a decryption processing unit 1404 decrypting the data on bus BS3 using individual private decryption key Kmc4 of memory card 110 that is paired with individual public encryption key KPmc4, and a memory 1415 to receive and store from bus BS3 encrypted content data {Dc}Kc, a license (Kc, ACp, ACm, license ID, content ID) for reproducing encrypted content data {Dc}Kc, additional information Dc-inf, a reproduction list of the encrypted content data, and a license administration file for administering the license. Memory 1415 is formed, for example, of a semiconductor memory. Memory 1415 includes a license region 1415A and a data region 1415B.

License region 1415A is a region to record licenses. License region 1415A stores a license (license key Kc, reproduction control information ACp, access control information ACm, license ID, content ID) per unit of recording exclusive for a license called "entry" to record a license. Access to a license is obtained by specifying by an entry number the entry where the license is stored or where the license is to be recorded.

Data region 1415B is a region to record encrypted content data {Dc}Kc, additional information Dc-inf of the encrypted content data, a license administration file storing information necessary to administer a license for each encrypted content data, a reproduction list storing basic information to access the encrypted content data and licenses recorded in the memory card, and entry information to administer the entry of license region 1415A. Data region 1415B can be externally accessed directly. The details of the license administration file and reproduction list will be described afterwards.

Memory card 110 further includes a controller 1420 to transfer data to/from an external source via bus BS3, determine an output of a license based on access control information ACm, and control the operation in memory card 110, such as administration of memory 1415.

The entire configuration besides data region 1415B is formed in a tamper-resistant module region.

In the following, the operation in each session in the data distribution system shown in FIG. 1 will be described.

[Distribution]

The operation of distributing the encrypted content data and license from distribution server 10 to memory card 110 loaded on mobile phone 100 in the data distribution system shown in FIG. 1 will first be described.

Figure 8:
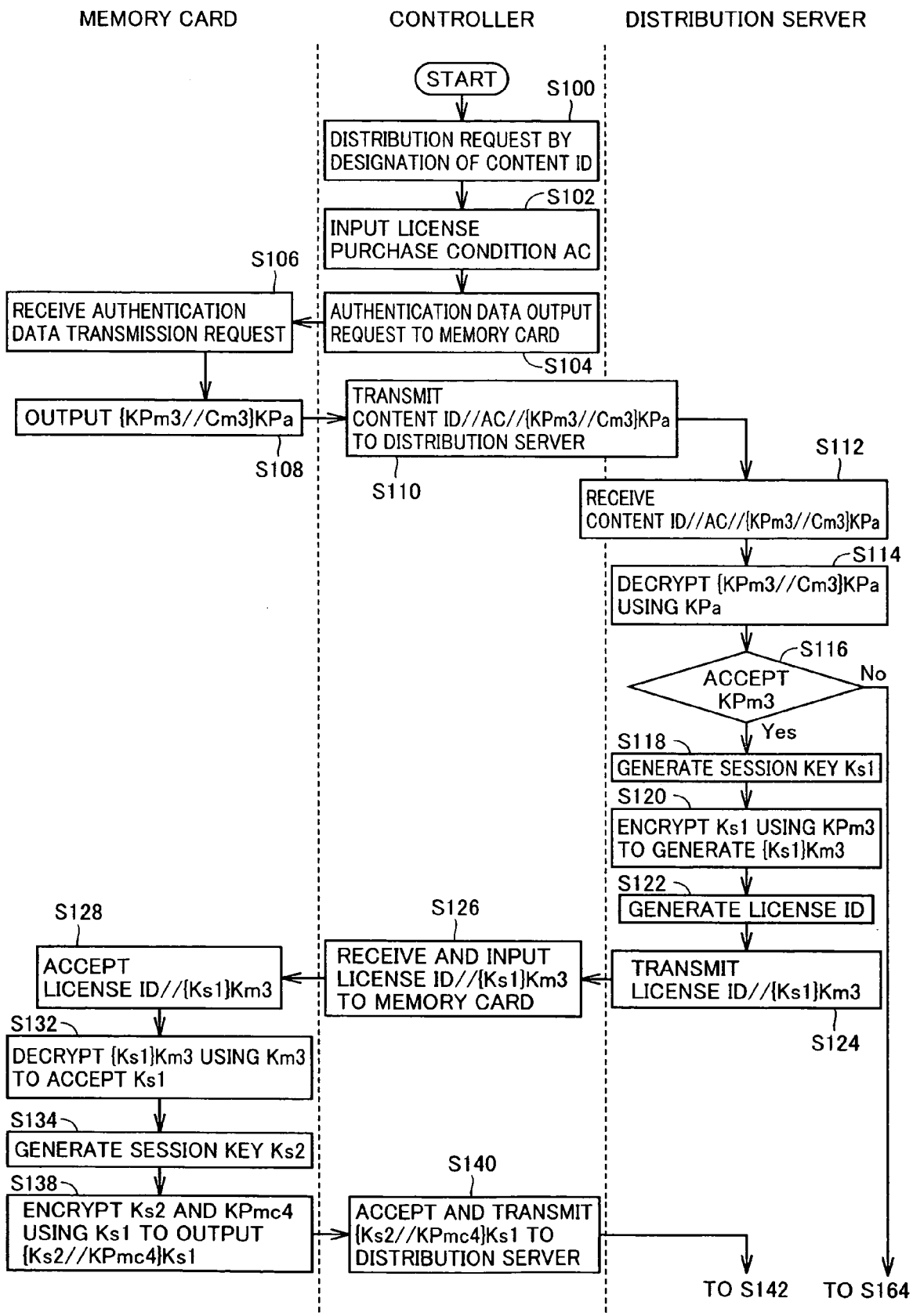
FIG. 8 is a first flow chart illustrating a distribution operation in the data distribution system shown in FIG. 1.
Figure 9:
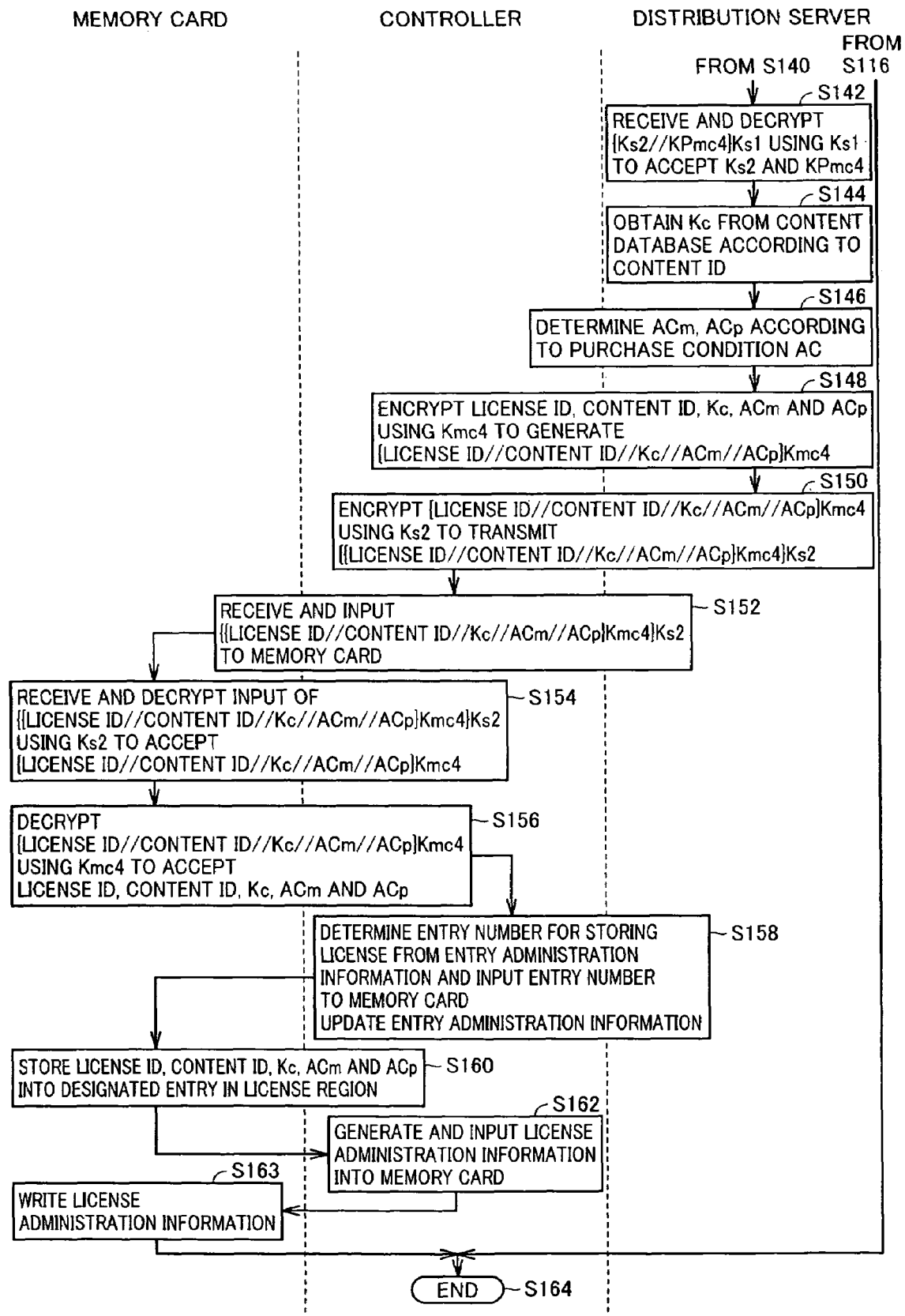
FIG. 9 is a second flow chart illustrating the distribution operation in the data distribution system shown in FIG. 1.

FIGS. 8 and 9 are first and second flow charts, respectively, to illustrate the operation (including a distribution session) of distributing a license to memory card 110 loaded onto mobile phone 100 at the time of purchase of encrypted content data in the data distribution system shown in FIG. 1.

It is assumed that, prior to the process in FIG. 8, the user of mobile phone 100 has established communication with distribution server 10 via a telephone network, obtained content ID for the content to be purchased, and obtained the entry administration information of memory card 110 to confirm that there is an empty entry in license region 1415A.

Referring to FIG. 8, a distribution request is made from the user of mobile phone 100 by designating content ID via operation panel 1116 (step S100). The user is then instructed to input purchase condition AC to purchase the license of the encrypted content data via operation panel 1116, and inputs purchase condition AC (step S102). Specifically, purchase condition AC for determining access control information ACm and reproduction control information ACp of the encrypted content data is input to purchase license key Kc to decrypt the selected encrypted content data. Purchase condition AC is input by controller 1120 according to the user's instruction only when distribution server 10 can distribute different kinds of licenses having different conditions for the same content. When only one kind of condition is set for the same content, that condition is automatically input by controller 1120 as purchase condition AC. In this example, a license with a limited usable time can be purchased.

Upon receiving purchase condition AC of the encrypted content data, controller 1120 provides an authentication data output instruction to memory card 110 via bus BS2 and memory card interface 1200 (step S104). Controller 1420 of memory card 110 receives an authentication data transmission request via terminal 1426, interface 1424 and bus BS3 (step S106). Controller 1420 then reads authentication data {KPm3//Cm3}KPa from authentication data hold unit 1400 via bus BS3 and outputs the read encrypted data {KPm3//Cm3}KPa via bus BS3, interface 1424 and terminal 1426 (step S108).

Controller 1120 of mobile phone 100 transmits to distribution server 10 content ID, license purchase condition data AC and the distribution request, in addition to authentication data {KPm3//Cm3}KPa from memory card 110 (step 110).

Distribution server 10 receives from mobile phone 100 the distribution request, content ID, authentication data {KPm3//Cm3}KPa, and license purchase condition data AC (step S112). In decryption processing unit 312, the authentication data output from memory card 110 is decrypted using public authentication key KPa (step S114).

Distribution control unit 315 performs an authentication process to determine whether or not authentication data subjected to encryption for proving its validity at an authorized agency has been received, based on the decryption process result from decryption processing unit 312 (step S116). When it is determined that valid authentication data is received, distribution control unit 315 authorizes and accepts class public encryption key KPm3 and class certificate Cm3. Then, control proceeds to the next process (step S118). When invalid authentication data is received, it is not authorized, and the distribution session ends without accepting class public encryption key KPm3 and class certificate Cm3 (step S164).

Upon confirmations, as a result of authentication, that the access is from a mobile phone loaded with a memory card having valid authentication data, session key generation unit 316 in distribution server 10 generates session key Ks1 for distribution (step S118). Session key Ks1 is encrypted by encryption processing unit 318 using class public encryption key KPm3 corresponding to memory card 110 that is obtained from decryption processing unit 312 (step S120).

Distribution control unit 315 generates license ID (step S122). The license ID and the encrypted session key Ks1 are output as license ID//{Ks1}Km3 to the outside via bus BS1 and communication device 350 (step S124).

When mobile phone 100 receives license ID//{Ks1}Km3, controller 1120 inputs license ID//{Ks1} Km3 to memory card 110 (step S126). Then, in memory card 110, controller 1420 accepts license ID//{Ks1}Km3 via terminal 1426 and interface 1424 (step S128). Controller 1420 then applies encrypted data {Ks1}Km3 to decryption processing unit 1422 via bus BS3, and decryption processing unit 1422 performs a decryption process to obtain session key Ks1 using class private decryption key Km3 unique to memory card 110 that is held in Km hold unit 1421, and session key Ks1 is then accepted (step S132).

Upon confirming the acceptance of session key Ks1 generated at distribution server 10, controller 1420 instructs session key generation unit 1418 to generate session key Ks2 to be generated in memory card 110 in the distribution operation. Session key generation unit 1418 then generates session key Ks2 (step S134).

Encryption processing unit 1406 encrypts session key Ks2 and an individual public encryption key KPmc4 applied by successively switching the contact of switch 1446 as a data train using session key Ks1 applied from decryption processing unit 1422 via contact Pa of switch 1442 to output encrypted data {Ks2//KPmc4}Ks1 onto bus BS3. The encrypted data {Ks2//KPmc4}Ks1 output onto bus BS3 is output from BS3 to mobile phone 100 via interface 1424 and terminal 1426 and is transmitted from mobile phone 100 to distribution server 10 (step S140).

Referring to FIG. 9, distribution server 10 receives encrypted data {Ks2//KPmc4}Ks1 to execute a decryption process using session key Ks1 in decryption processing unit 320 and accept session key Ks2 generated in memory card 110 and individual public encryption key KPmc4 of memory card 110 (step S142).

Distribution control unit 315 obtains license key Kc from information database 304 in accordance with content ID obtained at step S112 (step S144), and determines access control information ACm and reproduction control information ACp in accordance with purchase condition AC obtained at step S112 (step S146).

Distribution control unit 315 provides the generated license, that is, license ID, content ID, license key Kc, reproduction control information ACp, and access control information ACm to encryption processing unit 326. Encryption processing unit 326 encrypts the license using individual public encryption key KPmc4 of memory card 110 obtained from decryption processing unit 320 to generate encrypted data {license ID//content ID//Kc//ACm//ACp}Kmc4 (step S148). Then, encryption processing unit 328 encrypts encrypted data {license ID//content ID//Kc//ACm//ACp}Kmc4 from encryption processing unit 326 using session key Ks2 from decryption processing unit 320 to output encrypted data {{license ID//content ID//Kc//ACm//ACp}Kmc4}Ks2. Distribution control unit 315 transmits encrypted data {{license ID//content ID//Kc//ACm//ACp}Kmc4}Ks2 to mobile phone 100 via bus BS1 and communication device 350 (step S150).

Mobile phone 100 receives the transmitted encrypted data {{license ID//content ID//Kc//ACm//ACp}Kmc4}Ks2 to input the same to memory card 110 via bus BS2 (step S152). In memory card 110, the received data applied onto bus BS3 via terminal 1426 and interface 1424 is decrypted by decryption processing unit 1412. Decryption processing unit 1412 decrypts the received data on bus BS3 using session key Ks2 applied from session key generation unit 1418 to output the decrypted data onto bus BS3 (step S154).

At this stage, encrypted license {license ID//content ID//Kc//ACm//ACp}Kmc4 that can be decrypted using individual private decryption key Kmc4 held in Kmc hold unit 1402 is output onto bus BS3 (step S154).

Under instruction of controller 1420, encrypted license {license ID//content ID//Kc//ACm//ACp}Kmc4 is decrypted using individual private decryption key Kmc4 in decryption processing unit 1404 to accept the license (license key Kc, license ID, content ID, access control information ACm, and reproduction control information ACp) (step S156).

Controller 1120 of mobile phone 100 determines an entry number to store the license received from distribution server 10 based on the entry administration information read from memory 1415 of memory card 110, and inputs the determined entry number to memory card 110 via bus BS2 and memory card interface 1200. Then, controller 1120 adds to and updates the entry administration information (step S158).

Then, controller 1420 of memory card 110 receives the entry number via terminal 1426 and interface 1424 and stores the license (license key Kc, license ID, content ID, access control information ACm and reproduction control information ACp) obtained at step S156 into license region 1415A of memory 1415 as specified by the received entry number (step S160). Upon completion of writing of the license, controller 1120 updates the entry administration information to indicate that the entry number input to memory card 110 at step S158 is in use, and inputs the updated entry administration information to memory card 110 (step S162). Controller 1420 of memory card 110 writes the input entry administration information into data region 1415B of memory 1415 (step S163). The license distribution operation then ends (step S164).

After completion of the license distribution session, controller 1120 of mobile phone 100 transmits an encrypted content data distribution request to distribution server 10. Distribution server 10 receives the encrypted content data distribution request. Distribution control unit 315 of distribution server 10 then obtains encrypted content data {Dc} Kc and additional information Dc-inf from information database 304 to output the data via bus BS1 and communication device 350.

Mobile phone 100 receives {Dc}Kc//Dc-inf to accept encrypted content data {Dc}Kc and additional information Dc-inf. Then, controller 1120 inputs encrypted content data {Dc}Kc and additional information Dc-inf as one content file to memory card 110 via bus BS2 and memory card interface 1200. Controller 1120 also generates a license administration file for the entry number of the license stored in memory card 110, encrypted content data {Dc}Kc including license ID and content ID in plain text, and additional information Dc-inf to input the license administration file into memory card 110 via bus BS2 and memory card interface 1200. Furthermore, controller 1120 adds the names of the recorded content file and license administration file, information about the encrypted content data extracted from additional information Dc-inf (song title, artist's name), and the like to the reproduction list recorded in memory 1415 of memory card 110, and the entire process ends.

In this way, content data can be distributed upon confirming that memory card 110 loaded onto mobile phone 100 is a device storing valid authentication data and, at the same time, public encryption key KPm3 that can be encrypted and transmitted along with class certificate Cm3 is valid. Thus, distribution of content data to an unauthorized memory card can be prevented.

In addition, mutual authentication between the receiver side and the transmission side of encrypted data can be performed by exchanging encryption keys respectively generated at the distribution server and the memory card, executing encryption using each received encryption keys, and transmitting the encrypted data to the other party. Then, the security of the data distribution system can be improved.

Figure 10:
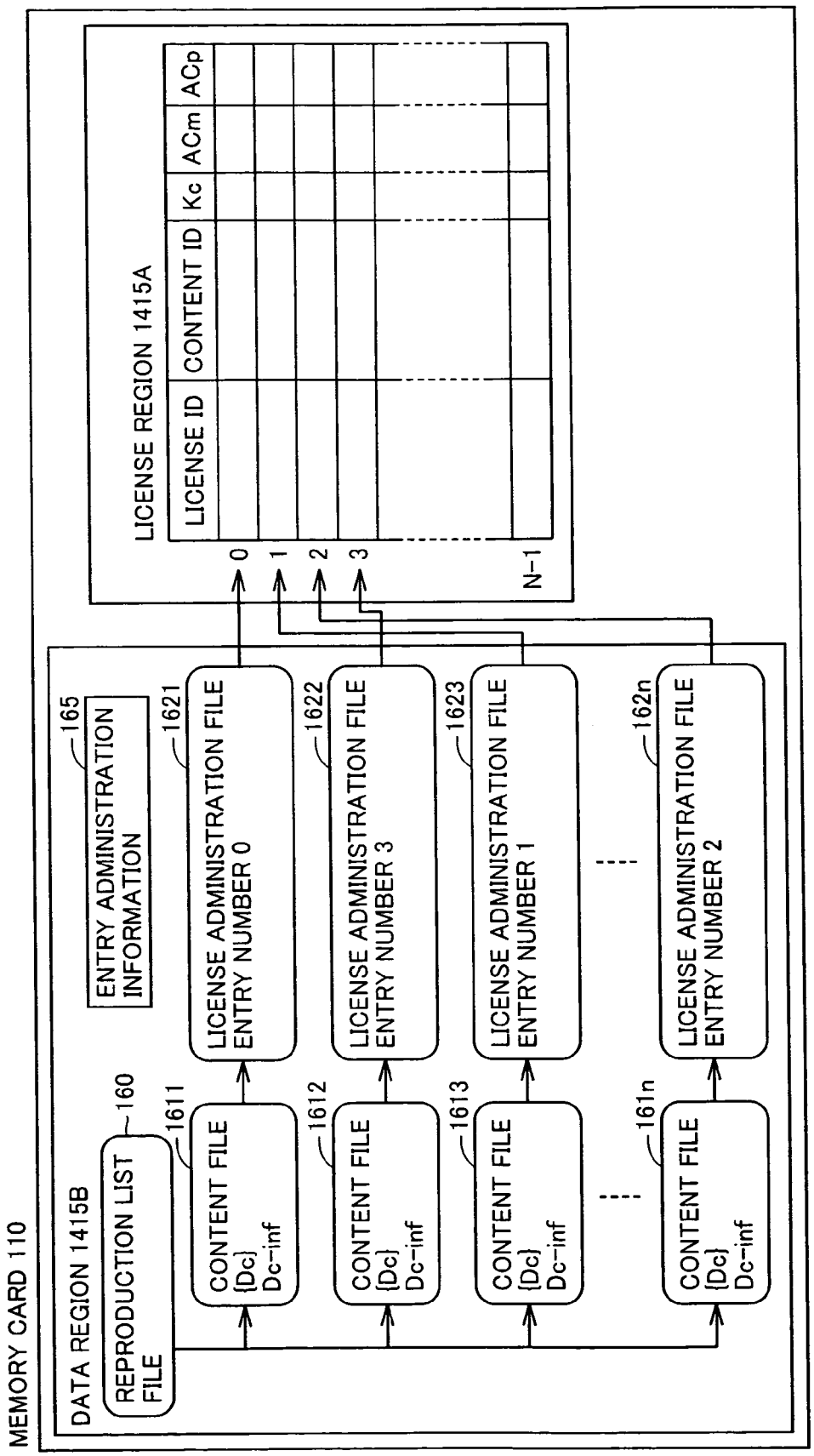
FIG. 10 illustrates a configuration of a reproduction list file in the memory card.

Referring to FIG. 10, license-region 1415A and data region 1415B in memory 1415 of memory card 110 will be described. A reproduction list file 160, entry administration information 165, content files 1611-161n, and license administration files 1621-162n are recorded in data region 1415B. Content files 1611-161n each store the received encrypted content data {Dc}Kc and additional information Dc-inf as one file. License administration files 1621-162n are recorded corresponding to content files 1611-161n, respectively.

Upon receiving the encrypted content data and license from distribution server 10, memory card 110 records the encrypted content data and license into memory 1415.

Accordingly, the license of the encrypted content data transmitted from distribution server 10 to memory card 110 is recorded in that region of license region 1415A of memory 1415 which is specified by the entry number. The entry number can be obtained by reading the license administration file of reproduction list file 160 recorded in data region 1415B of memory 1415. The corresponding license can be read from license region 1415A using the obtained entry number. Furthermore, the license administration file stores the presence or absence of a license usage condition, that is, the presence or absence of limitations by access control information ACm and reproduction control information ACp created in accordance with purchase condition AC, to allow the license usage condition to be confirmed prior to reproduction and copy/transfer.

[Reproduction]

As described above, memory card 110 loaded onto mobile phone 100 can receive the encrypted content data and license from distribution server 10. Reproduction of encrypted content data received by the memory card will now be described.

Figure 11:
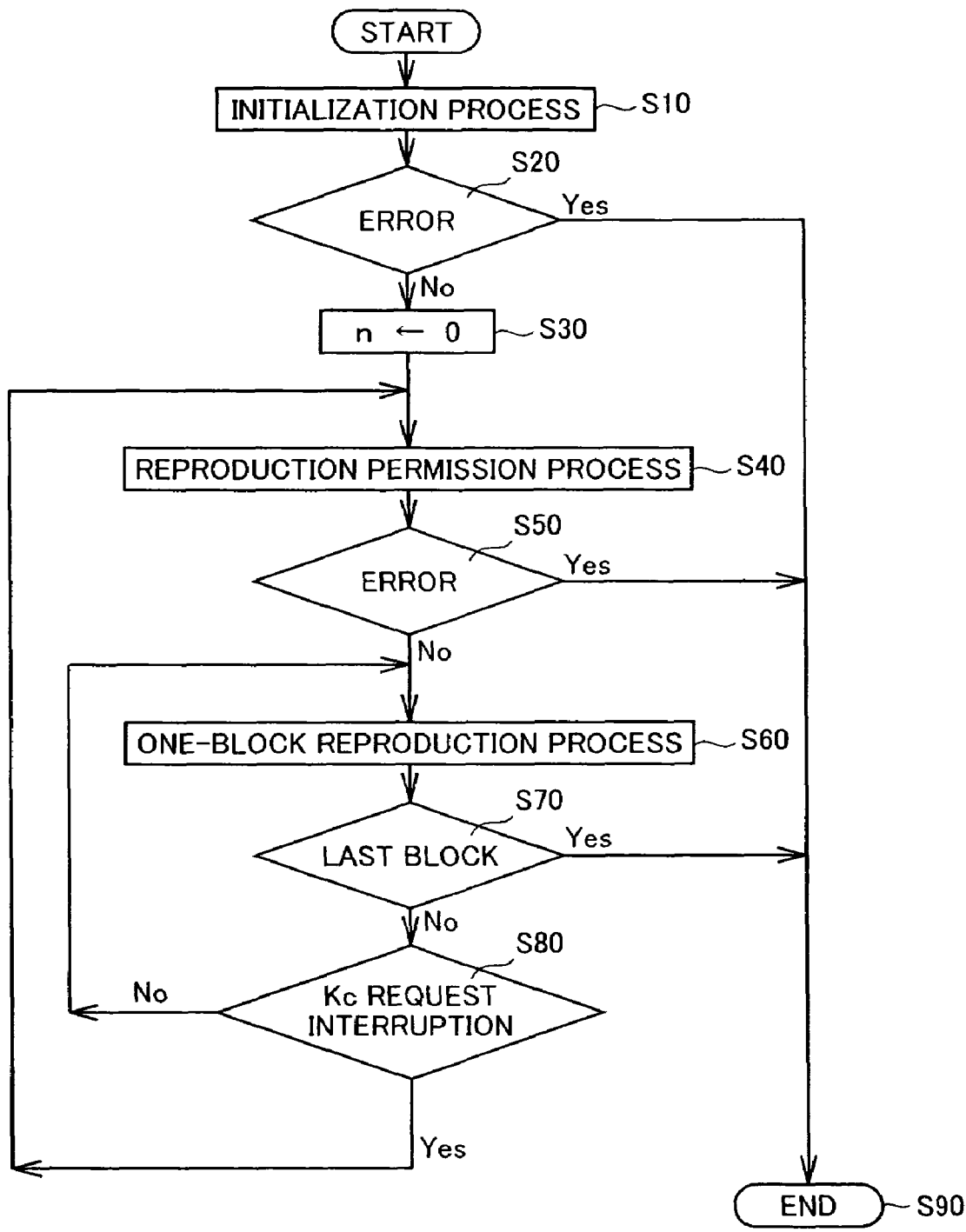
FIG. 11 is a flow chart illustrating a reproduction operation of encrypted content data in the mobile phone.

FIG. 11 is a flow chart illustrating an operation of reproducing encrypted content data received by memory card 110 in mobile phone 100. It is assumed that, prior to the process shown in FIG. 11, the user of mobile phone 100 has determined a content (song) to be reproduced according to the reproduction list recorded in data region 1415B of memory card 110, specified a content file, and obtained a license administration file.

Referring to FIG. 11, upon the start of the reproduction operation, the user of mobile phone 100 inputs a reproduction request to mobile phone 100 via operation panel 1116. Then, an initialization process is carried out between mobile phone 100 and memory card 110 (step S10). When the initialization process normally ends, controller 1420 of memory card 110 confirms that content reproduction circuit 1550 is a proper circuit that can receive license key Kc to reproduce encrypted content data {Dc} Kc, thereby allowing a reproduction permission process for outputting license key Kc. The detail of this initialization process will be described later. Upon completion of the initialization process, controller 1120 of mobile phone 100 determines whether or not an error occurs in the initialization process (step S20). When an error occurs, the operation of reproducing encrypted content data ends (step S90).

When controller 1120 determines that no error occurs in the initialization process at step S20, n=0 is set (step S30). The encrypted content data is divided into a plurality of blocks and is encrypted per block. Content reproduction circuit 1550 obtains the encrypted content data per block in order from memory card 110, decrypts and reproduces the encrypted content data per block n is a number indicative of the order of the obtained blocks. Thereafter, a reproduction permission process is carried out (step S40). The reproduction permission process is a process for reproduction control unit 1514 to receive license key Kc and reproduction control information ACp output from memory card 110, confirm whether or not reproduction is permitted based on the received reproduction control information ACp, and supply the received license key Kc to decryption processing unit 1516. When a time period is designated by hold time Valid_t in reproduction control information ACp, reproduction control unit 1514 instructs timer 1512 to cause a timer interruption after the expiration of the time period designated by hold time Valid_t. The detail of this reproduction permission process will also be described later. Upon completion of the reproduction permission process, controller 1120 of mobile phone 100 determines whether or not an error occurs in the reproduction permission process (step S50). When an error occurs, the operation of reproducing encrypted content data ends (step S90). When controller 1120 determines that no error occurs in the reproduction permission process at step S50, an operation of reproducing one block is performed (step S60). The detail of this one block reproduction process will also be described later.

Thereafter, controller 1120 of mobile phone 100 determines whether or not reproduction of the encrypted content data is completed to the last block (step S70). When it is determined that reproduction of the encrypted content data is completed to the last block, the reproduction operation ends (step S90). When it is determined that reproduction of the encrypted content data is not completed to the last block at step S70, controller 1120 of mobile phone 100 determines whether or not a license key Kc request interruption is created (step S80). When the license key Kc request interruption is not to be created, steps S60, S70 and S80 are repeated. When it is determined that the license key Kc request interruption is to be created at step S80, steps S40, S50, S60 and S70 are repeated.

The license key Kc request interruption at step S80 means to request memory card 110 to re-output license key Kc and reproduction control information ACP when the hold time of license key Kc in content reproduction circuit 1550 of mobile phone 100 reaches hold time Valid_t included in reproduction control information ACP.

As is clear from the flow chart shown in FIG. 11, once the initialization process is carried out in the reproduction operation, the initialization process need not be performed thereafter to reproduce the encrypted content data.

Figure 12:
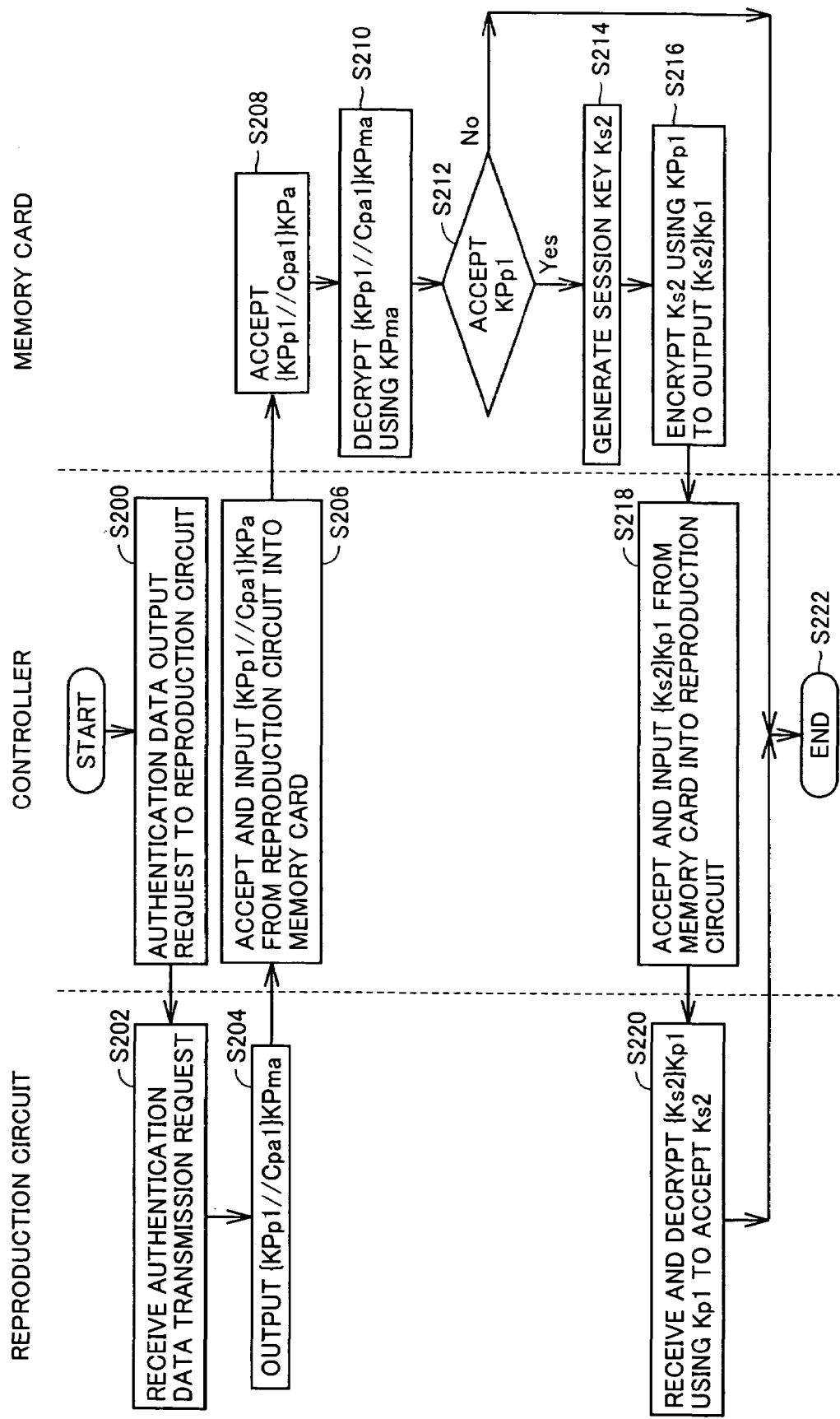
FIG. 12 is a flow chart illustrating an initialization process operation shown in FIG. 11.

FIG. 12 is a flow chart illustrating the operation of the initialization process (step S10) shown in FIG. 11 in detail. Referring to FIG. 12, upon receiving a reproduction request, controller 1120 requests content reproduction circuit 1550 to output authentication data via bus BS2 (step S200). Then, content reproduction circuit 1550 receives the authentication data output request (step S202). Then, authentication data hold unit 1500 outputs authentication data {KPp1//Cpa1}KPa (step S204), and controller 1120 inputs authentication data {KPp1//Cpa1}KPa to memory card 110 via memory card interface 1200 (step S206).

In response, memory card 110 accepts authentication data {KPp1//Cpa1}KPa (step S208). Decryption processing unit 1408 decrypts the accepted authentication data {KPp1//Cpa1}KPa using public authentication key KPa held in KPa hold unit 1414 (step S210). Controller 1420 carries out an authentication process based on the decryption process result in decryption processing unit 1408. Specifically, the authentication process is carried out to determine whether or not authentication data {KPp1//Cpa1}KPa is proper authentication data (step S212). When the decryption fails, control proceeds to step S222, and the initialization process ends. When the authentication data is successfully decrypted, controller 1420 controls session key generation unit 1418 so that session key generation unit 1418 generates session key Ks2 for a reproduction session (step S214). Then, encryption processing unit 1410 encrypts session key Ks2 from session key generation unit 1418 using public encryption key KPp1 decrypted by decryption processing unit 1408 to output encrypted data {Ks2}Kp1 onto bus BS3. Controller 1420 then outputs encrypted data {Ks2}Kp1 to memory card interface 1200 via interface 1424 and terminal 1426 (step S216). Controller 1120 of mobile phone 100 obtains encrypted data {Ks2}Kp1 via memory card interface 1200. Then, controller 1120 applies encrypted data {Ks2}Kp1 to decryption processing unit 1504 of content reproduction circuit 1550 via bus BS2 (step S218). Decryption processing unit 1504 decrypts encrypted data {Ks2}Kp1 using private decryption key Kp1 paired with public encryption key KPp1 that has been output from Kp hold unit 1502, to accept session key Ks2 (step S220). The initialization process then ends (step S222).

Figure 13:
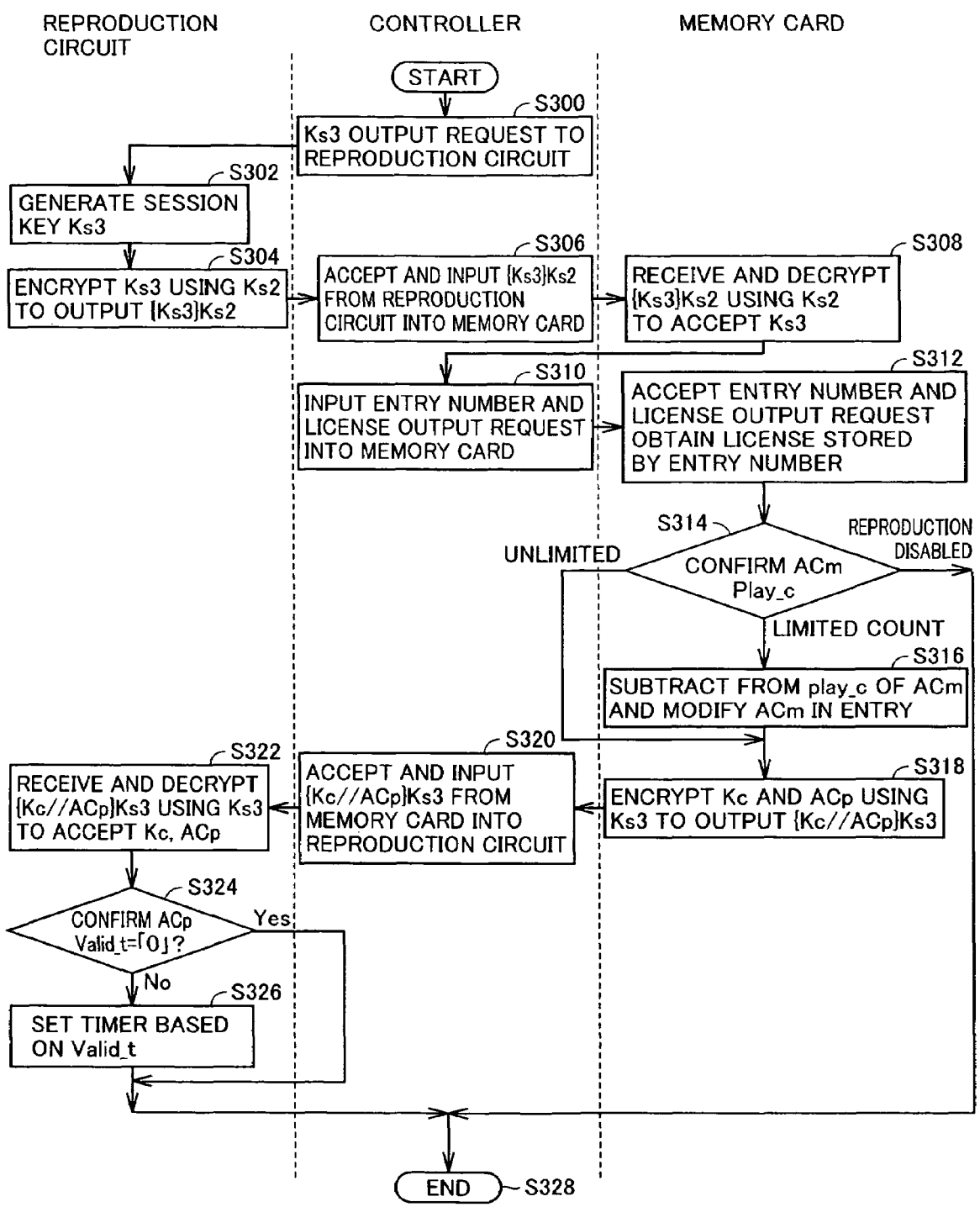
FIG. 13 is a flow chart illustrating a reproduction permission process operation shown in FIG. 11.

FIG. 13 is a flow chart illustrating the operation of the reproduction permission process (step S40) shown in FIG. 11 in detail. Referring to FIG. 13, when it is determined that no error occurs at step S30 shown in FIG. 11, controller 1120 of mobile phone 100 instructs content reproduction circuit 1550 to output session key Ks3 (step S300). Session key generation unit 1508 of content reproduction circuit 1550 generates session key Ks3 for reproduction session and outputs session key Ks3 to encryption processing unit 1506 (step S302). Encryption processing unit 1506 encrypts session key Ks3 from session key generation unit 1508 using session key Ks2 from decryption processing unit 1504 and outputs encrypted data {Ks3}Ks2 onto bus BS2 (step S304). Controller 1120 outputs to memory card 110 via memory card interface 1200 encrypted data {Ks3}Ks2 output onto bus BS2 (step 306).

Decryption processing unit 1412 of memory card 110 receives encrypted data {Ks3}Ks2 via terminal 1426, interface 1424 and bus BS3. Decryption processing unit 1412 decrypts encrypted data {Ks3}Ks2 using session key Ks2 generated by session key generation unit 1418 to accept session key Ks3 generated in content reproduction circuit 1550 of mobile phone 100 (step S308).

Controller 1120 of mobile phone 100 obtains the entry number by which the license is stored from the license administration file of a reproduction request song that has been obtained from memory card 110 in advance. The obtained entry number and the license output request are input to memory card 110 via memory card interface 1200 (step S310).

Controller 1420 of memory card 110 accepts the entry number and the license output request to obtain the license stored in a region as designated by the entry number (step S312). Thereafter, controller 1420 confirms access limitation information ACm included in the license (step S314).

At step S314, access limitation information ACm that is information about limitations on access to the memory is confirmed. Specifically, the reproduction count is confirmed. Then, when reproduction is already disabled, the reproduction operation ends. When the access limitation information has a limit on the reproduction count, the reproduction count in access limitation information ACm is modified (step S316), and then control proceeds to the next step (step S318). On the other hand, when reproduction is not restricted by the reproduction count included in access limitation information ACm, step S316 is skipped, and the process proceeds to the next step (step S318) without modifying the reproduction count in access limitation information ACm.

When it is determined that reproduction is permitted in that reproduction operation at step S314, license key Kc and reproduction control information ACp of the reproduction request song recorded in license region 1415A of memory 1415 are output onto bus BS3 (step S318).

The obtained license key Kc and reproduction control information ACp are sent to encryption processing unit 1406 via bus BS3. Encryption processing unit 1406 encrypts license key Kc and reproduction control information ACp received via bus BS3 using session key Ks3 received from decryption processing unit 1412 via contact Pb of switch 1442 and outputs encrypted data {Kc//ACp}Ks3 onto bus BS3.

The encrypted data {Kc//ACp}Ks3 output onto bus BS3 is output to mobile phone 100 via interface 1424, terminal 1426 and memory card interface 1200 (step S318).

Controller 1120 of mobile phone 100 receives encrypted data {Kc//ACp}Ks3 via memory card interface 1200 and bus BS2 and applies the received encrypted data {Kc//ACp}Ks3 to decryption processing unit 1510 of content reproduction circuit 1550 via bus BS2 (step S320). Then, decryption processing unit 1510 decrypts encrypted data {Kc//ACp}Ks3 applied via bus BS2 using session key Ks3 from session key generation unit 1508 and outputs license key Kc and reproduction control information ACp to reproduction control unit 1514. In this way, license key Kc and reproduction control information ACp are accepted (step S322).

Reproduction control unit 1514 determines whether or not there is a reproduction condition of encrypted content data {Dc}Kc based on reproduction control information ACp (step S324). Specifically, reproduction control unit 1514 confirms hold time Valid_t included in reproduction control information ACp. As hold time Valid_t has a value "0" set to indicate that the usage time of license key Kc in content reproduction circuit 1550 is unlimited or has a value other than "0" set to indicate that the usage time of license key Kc in content reproduction circuit 1550 is limited, reproduction control unit 1514 confirms a value set in hold time Valid_t. Then, at step S324, when "0" is set in hold time Valid_t, license key Kc can be used without limitation, and license key Kc is held in reproduction control unit 1514 so as to supply license key Kc to decryption processing unit 1516. The reproduction permission process then ends (step S328).

On the other hand, at step S324, when a value other than "0" is set in hold time Valid_t, the time in which license key Kc can be used for reproduction in content reproduction circuit 1550 is limited. Accordingly, reproduction control unit 1514 sets timer 1512 based on the value of hold time Valid_t in order to count the usage time of license key Kc in content reproduction circuit 1550 (step S326). The reproduction permission process then ends (step S328).

In this way, in the reproduction permission process, hold time Valid_t included in reproduction control information ACp obtained from memory card 110 is confirmed, and when a limited time to hold license key Kc is set in hold time Valid_t, reproduction control unit 1514 sets timer 1512 prior to reproduction. Accordingly, license key Kc held for reproduction in reproduction control unit 1514 can be discarded automatically by a timer interruption from timer 1512 at the expiration of hold time Valid_t after the start of use, so that the control on hold time Valid_t is safely performed within content reproduction circuit 1550. Furthermore, reproduction control unit 1514 can use a timer interruption from timer 1512 to make a determination to output the license key Kc request interruption that instructs controller 1120 to perform a reproduction permission process of the same license again, simultaneously with discarding license key Kc or immediately before discarding license key Kc, in order to carry out the reproduction continuously even after discarding license key Kc. In the following, it is assumed that license key Kc request interruption is output simultaneously with discarding license key Kc.

Figure 14:
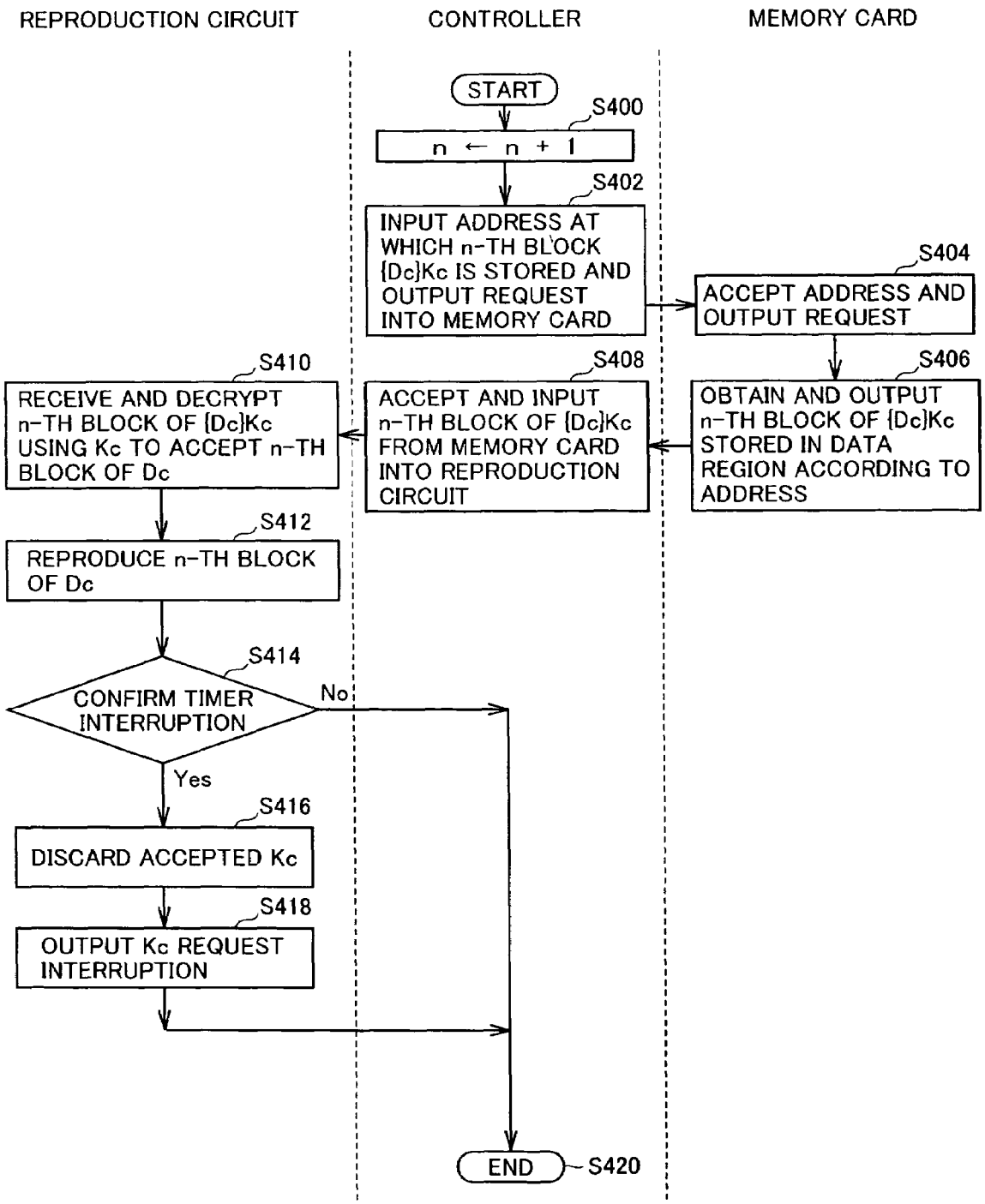
FIG. 14 is a flow chart illustrating a one-block reproduction process shown in FIG. 11.

FIG. 14 is a flow chart illustrating the operation of the one-block reproduction process (step S60) shown in FIG. 11 in detail. Referring to FIG. 14, when it is determined that no error occurs in the reproduction permission process at step S50 shown in FIG. 11, controller 1120 of mobile phone 100 sets n=n+1 (step S400), and outputs the address at which encrypted content data {Dc}Kc of the n-th block is stored and a request to output the data stored at that address to memory card 110 via bus BS2 and memory card interface 1200 (step S402).

Then, controller 1420 of memory card 110 accepts the address and the output request via terminal 1426, interface 1424 and bus BS3 (step S404), obtains via bus BS3 encrypted content data {Dc}Kc of the n-th block stored in data region 1415B of memory 1415 specified by the accepted address, and outputs the obtained encrypted content data {Dc}Kc of the n-th block to mobile phone 100 via bus BS3, interface 1424 and terminal 1426 (step S406).

Controller 1120 of mobile phone 100 accepts encrypted content data {Dc}Kc of the n-th block via memory card interface 1200 and bus BS2 and supplies the accepted encrypted content data {Dc}Kc of the n-th block to decryption processing unit 1516 of content reproduction circuit 1550 (step S408). Decryption processing unit 1516 decrypts encrypted content data {Dc}Kc of the n-th block using license key Kc received from reproduction control unit 1514 to obtain content data Dc of the n-th block (step S410). Thereafter, content data Dc is applied to music reproduction unit 1518, which then reproduces content data Dc of the n-th block. DA converter unit 1519 converts the digital signal to an analog signal for output to terminal 1530. The music data is then output from terminal 1530 via an external output device to headphone 130 for reproduction (step S412).

Then, reproduction control unit 1514 confirms a timer interruption (step S414). Specifically, when no timer interruption occurs, reproduction control unit 1514 determines that the elapsed time is not greater than the time set in hold time Valid_t. The one-block reproduction process ends at this point (step S420).

When a timer interruption occurs, reproduction control unit 1514 determines that the elapsed time is greater than the time set in hold time Valid_t, and discards the held license key Kc (step S416). At the same time, reproduction control unit 1514 outputs a license key Kc request interruption (step S418). Then, the one-block reproduction process ends (step S420).

Although step S412 and step S414 have been described here as being performed in order, the processes are always performed in a continuous manner since music reproduction unit 1518 is a real time processing circuit to guarantee continuous reproduction. Therefore, upon the start of the process at step S412, the process of the next step S414 starts. In addition, before step S412 for the next block starts, the process up to step S410 for the next block should be completed. In other words, content data is repeatedly supplied per block in such a manner that reproduction can be carried out to the last block continuously without a break in music reproduction unit 1518.

The output of the license key Kc request interruption that is effected when the hold time of license key Kc held in content reproduction circuit 1550 exceeds the time set in hold time Valid_t included in reproduction control information ACp (see step S418) is used to determine whether or not there is a license key Kc request interruption at step S80 shown in FIG. 11.

Upon completion of decryption of encrypted content data {Dc}Kc included in one block using license key Kc as well as reproduction of content data Dc, reproduction control unit 1514 determines whether or not the usage time of license key Kc exceeds the time set in hold time Valid_t included in reproduction control information ACp (see step S414). As long as the usage time of license key Kc used in content reproduction circuit 1550 does not exceed the time set in hold time Valid_t, one-block reproduction processes are continuously repeated according to the reproduction order of encrypted content data using the held license key Kc. When the reproduction is completed to the final block, that is, to the end of the song, the reproduction process ends (see steps S70 and S90 in FIG. 11).

When the usage time of license key Kc held in content reproduction circuit 1550 reaches the time set in hold time Valid_t before the last block is reached, the held license key Kc is discarded and a license key Kc request interruption is output to receive the same license key Kc from memory card 110 (see steps S416 and S418 in FIG. 14). Then, through the reproduction permission process that is carried out again in response to the output license key Kc request interruption, content reproduction circuit 1550 again holds the same license key Kc as the discarded license key Kc.

As long as the hold time of license key Kc held in content reproduction circuit 1550 does not exceed the time set in hold time Valid_t, one-block reproduction processes are continuously repeated again according to the reproduction order of encrypted content data until the final block is reached.

In this manner, encrypted content data can be reproduced to the end by using hold time Valid_t as the reproduction control information.

Hold time Valid_t and reproduction count Play_c can be set freely by content suppliers in order to provide services as desired by copyright owners and content suppliers. For example, a license reproducible only for 30 minutes can be controlled with the precision of two minutes by setting hold time Valid_t="2" and reproduction count Play_c="15".

In addition, hold time Valid_t can be used to prevent reproduction carried out more than once using license key Kc held by single reproduction permission to repeatedly reproduce the same song. For example, assuming that the reproduction time of encrypted content data is two minutes and thirty seconds, hold time Valid_t="3" can be set to prevent twice repeated reproduction with single reproduction permission.

In the foregoing, it has been described that license key Kc is obtained from memory card 110 when the hold time of license key Kc exceeds the time set in hold time Valid_t. Alternatively, in a system in which the speed of obtaining license key Kc is low, a request to obtain license key Kc may be output to memory card 110 to obtain license key Kc from memory card 110 before the usage time of license key Kc exceeds the time set in hold time Valid_t, so that the encrypted content data is continuously reproduced. This can easily be realized since the operation of reproducing encrypted content data in content reproduction circuit 1550 and the operation of obtaining license key Kc from memory card 110 can be carried out in parallel.

In the foregoing description, the operation of obtaining license key Kc, reproduction control information ACp and encrypted content data {Dc}Kc from memory card 110 is performed by controller 1120, and the operation of controlling the reproduction operation of encrypted content data in content reproduction circuit 1550 (including the operation of determining whether or not the hold time of license key Kc exceeds the time set in hold time Valid_t, and the operation of discarding license key Kc when the usage time of license key Kc exceeds the time set in hold time Valid_t) is performed by reproduction control unit 1514. Alternatively, in the present invention, the operation performed by controller 1120 and the operation performed by reproduction control unit 1514 may be performed by one control circuit.

In accordance with the embodiment of the present invention, by controlling the count Play_c of the license key to be output from the memory card to the content reproduction circuit as well as the hold time Valid_t of the license key held at a time in the content reproduction circuit, the entire reproduction time of encrypted content data can be defined by Play_c×Valid_t. Furthermore, by changing the time set in hold time Valid_t, a reproducible time with license key Kc obtained by a single reproduction permission process can be changed freely.

Although, in the foregoing description, music data is downloaded and recorded as content data in a memory card loaded on a mobile phone and the music data recorded in the memory card is reproduced by a content reproduction circuit included in the mobile phone, the present invention is not limited thereto.

The present invention is applicable not only to music data but also to image data, motion picture data, text data, reading data, sound source data, application programs such as games, and the like. The present invention is generally applicable to data of which right should be protected for copyright or right owners thereof.

Although it has been described that a license is downloaded via a mobile phone network, the present invention does not limit a supply source of data and is applicable to a digital communication network such as the Internet. Alternatively, a license may be directly written into a memory card by an apparatus such as a personal computer.

Although in the foregoing description a recording apparatus that records the license is a memory card by way of example, the present invention is not limited to a memory card, and any medium such as hard disk may be employed as long as it can control input/output.

The license and encrypted content data may not be recorded onto the same recording apparatus. The encrypted content data may be recorded in a conventional recording apparatus.

Although in the foregoing description a content reproduction circuit is included in a mobile phone, the mobile phone is not always required. The function of connecting to a distribution server for downloading may not be performed by the same terminal. A recording apparatus (memory card) may be configured with a download terminal for recording a license and a reproduction terminal including a content reproduction circuit to obtain encrypted content data and licenses from the recording apparatus (memory card) for reproduction.

It should be understood that the embodiment disclosed herein is by way of example and not by way of limitation. The scope of the present invention is shown not by the above description of the embodiment but by the claims, and it is intended that equivalents to the claims and all modifications within the scope of the claims are embraced herein.

INDUSTRIAL APPLICABILITY

In accordance with the present invention, a data terminal apparatus can define the entire reproduction time of encrypted content data by the number of times×the hold time by controlling the number of times that a license key for decrypting the encrypted content data can be output and the hold time of the license key at a time. The present invention is therefore useful when applied to a data terminal apparatus that can safely control a reproduction time.

The invention claimed is:

1. A data reproduction apparatus decrypting and reproducing encrypted content data of which reproduction is defined by first reproduction control information that specifies an allowable retrieval count of a license key for decrypting encrypted content data from a data recording apparatus for reproduction and second reproduction control information that specifies an allowable hold time of the retrieved license key, comprising:
  an interface controlling data transfer from/to said data recording apparatus;
  content reproduction means decrypting and reproducing said encrypted content data using said license key;
  key operation means inputting an instruction;
  control means and
  a timer unit notifying said control means of passage of time, wherein
  said control means obtains said encrypted content data, said license key and said second reproduction control information from said data recording apparatus via said interface in response to a reproduction request for said encrypted content data that is input via said key operation means, applies the obtained license key and encrypted content data to said content reproduction means, discards the license key applied to said content reproduction means when an elapsed time after application of said license key to said content reproduction means reaches the allowable hold time specified by said second reproduction control information, and obtains again said license key, which is not the discarded license key, and said second reproduction control information from said data recording apparatus for application to said content reproduction means at a timing that allows said encrypted content data to be reproduced continuously,
  upon starting to use said license key, said control means performs on said timer unit a timer setting of the allowable hold time specified by said second reproduction control information,
  said timer unit notifies said control means when said allowable hold time has expired after said timer setting, and
  said control means obtains said encrypted content data per block from said data recording apparatus for application to said content reproduction means, and determines whether or not said elapsed time reaches said allowable hold time every time the encrypted content data included in one block is applied to said content reproduction means.

2. The data reproduction apparatus according to claim 1, wherein
  when it is determined that said elapsed time reaches said allowable hold time, said control means discards the license key applied to said content reproduction means and newly obtains said license key from said data recording apparatus via said interface.

3. The data reproduction apparatus according to claim 1, herein
  said control means newly obtains, before said elapsed time reaches said allowable hold time, said license key from said data recording apparatus via said interface, and discards, when said elapsed time reaches said allowable hold time, the license key applied to said content reproduction means, and applies said newly obtained license key to said content reproduction means.

4. The data reproduction apparatus according to claim 1, herein
  when it is determined that said elapsed time does not reach said allowable hold time, said control means obtains a next block from said data recording apparatus via said interface and applies the obtained next block to said content reproduction means.

5. A data reproduction apparatus decrypting and reproducing encrypted content data of which reproduction is defined by first reproduction control information that specifies an allowable retrieval count of a license key for decrypting encrypted content data from a data recording apparatus for reproduction and second reproduction control information that specifies an allowable hold time of the retrieved license key, comprising:
- an interface controlling data transfer to/from said data recording apparatus;
- content reproduction means decrypting and reproducing said encrypted content data using said license key;
- key operation means inputting an instruction; and
- control means,
- said content reproduction means including
  - a content decryption unit decrypting said encrypted content data using said license key,
  - a reproduction control unit controlling a reproduction process of said encrypted content data, and
  - a timer unit notifying said reproduction control unit of passage of time, wherein
- said control means obtains said encrypted content data, said license key and said second reproduction control information from said data recording apparatus via said interface in response to a reproduction request for said encrypted content data that is input via said key operation means, applies the obtained license key, encrypted content data and second reproduction control information to said content reproduction means, and obtains again said license key, which is not the discarded license key, and said second reproduction control information from said data recording apparatus for application to said content reproduction means in response to an instruction to obtain said license key from said reproduction control unit, and
- said reproduction control unit supplies said applied encrypted content data and license key to said content decryption unit, discards the license key supplied to said content decryption unit when an elapsed time after starting to use said license key in said content decryption unit reaches the allowable hold time specified by said second reproduction control information, and instructs said control means to obtain again said license key, which is not the discarded license key, from said data recording apparatus at a timing that allows said encrypted content data to be reproduced continuously,
- upon starting to use said license key, said reproduction control unit performs on said timer unit a timer setting of the allowable hold time specified by said second reproduction control information,
- said timer unit notifies said reproduction control unit when said allowable hold time has expired after said timer setting,
- said control means obtains said encrypted content data per block from said data recording apparatus for application to said content reproduction means, and
- said reproduction control unit determines whether or not said elapsed time reaches said allowable hold time every time reproduction of encrypted content data included in one block is completed.

6. The data reproduction apparatus according to claim 5, herein
- when it is determined that said elapsed time reaches said allowable hold time, said reproduction control unit discards the license key applied to said content decryption unit and outputs a request to reobtain said license key to said control means, and
- said control means obtains said license key and said second reproduction control information from said data recording apparatus via said interface in response to said request to reobtain, and applies the obtained license key and second reproduction control information to said content reproduction means.

7. The data reproduction apparatus according to claim 5, herein
- said reproduction control unit outputs, before said elapsed time reaches said allowable hold time, said request to reobtain the license key to said control means, and discards, when said elapsed time reaches said allowable hold time, the license key applied to said content decryption unit, and
- said control means obtains said license key and said second reproduction control information from said data recording apparatus via said interface in response to said request to reobtain, and applies the obtained license key and second reproduction control information to said content reproduction means.

8. The data reproduction apparatus according to claim 5, herein
- when it is determined that said elapsed time does not reach said allowable hold time, said reproduction control unit outputs a request to obtain a next block to said control means, and
- said control means obtains said next block from said data recording apparatus via said interface for application to said content reproduction means in response to said request to obtain.

9. A data reproduction apparatus decrypting and reproducing encrypted content data of which reproduction is defined by first reproduction control information that specifies an allowable retrieval count of a license key for decrypting encrypted content data from a data recording apparatus for reproduction and second reproduction control information that specifies an allowable hold time of the retrieved license key, comprising:
- an interface controlling data transfer from/to said data recording apparatus;
- content reproduction means decrypting and reproducing said encrypted content data using said license key;
- key operation means inputting an instruction;
- control means and
- a timer unit notifying said control means of passage of time, wherein
- said control means obtains said encrypted content data, said license key and said second reproduction control information from said data recording apparatus via said interface in response to a reproduction request for said encrypted content data that is input via said key operation means, applies the obtained license key and encrypted content data to said content reproduction means, discards the license key applied to said content reproduction means when an elapsed time after application of said license key to said content reproduction means reaches the allowable hold time specified by said second reproduction control information, and obtains again said license key, which is not the discarded license key, and said second reproduction control information from said data recording apparatus for application to said content reproduction means at a timing that allows said encrypted content data to be reproduced continuously,
- the data reproduction apparatus further comprising a certificate hold unit holding a certificate for said data recording apparatus, wherein
- said control means transmits said certificate to said data recording apparatus via said interface in response to said reproduction request, and receives said encrypted content data, said license key and said second reproduction control information from said data recording apparatus via said interface when said certificate is authenticated in said data recording apparatus, wherein said certificate includes a public key that is unique to the data reproduction apparatus and uniquely corresponds to the certificate itself, said data reproduction apparatus further comprising:

private key hold means holding a private key for decrypting data encrypted by said public key;

first decryption processing means decrypting the data encrypted by said public key using said private key;

session key generation means generating a first session key for identifying communication with said data recording apparatus;

encryption processing means encrypting data using a second session key generated in said data recording apparatus; and second decryption processing means decrypting data encrypted by said first session key, wherein when said license key and said second reproduction control information are obtained from said data recording apparatus, said session key generation means generates said first session key, said first decryption processing means decrypts said second session key encrypted by said public key using said public key, said encryption processing means encrypts said first session key using the second session key obtained by said first decryption processing means, said control means applies to said first decryption processing means said second session key encrypted by said public key received from said data recording apparatus via said interface, transmits said first session key encrypted by said second session key to said data recording apparatus via said interface, and applies to said second decryption processing means said license key and said second reproduction control information encrypted by said first session key received from said data recording apparatus via said interface, and said second decryption processing means decrypts said license key and said second reproduction control information encrypted by said first session key using said first session key, and applies the decrypted license key and second reproduction control information to said content reproduction means.

10. A data reproduction circuit included in a data reproduction apparatus decrypting and reproducing encrypted content data of which reproduction is defined by first reproduction control information that specifies an allowable retrieval count of a license key for decrypting encrypted content data from a data recording apparatus for reproduction and second reproduction control information that specifies an allowable hold time of the retrieved license key, comprising:

a content decryption unit decrypting said encrypted content data using said license key;

a reproduction control unit controlling a reproduction process of said encrypted content data; and a timer unit notifying said reproduction control unit of passage of time, wherein said reproduction control unit supplies externally applied said encrypted content data and said license key to said content decryption unit, discards the license key supplied to said content decryption unit when an elapsed time after starting to use said license key in said content decryption unit reaches the allowable hold time specified by said second reproduction control information externally applied along with said license key, and externally outputs an instruction to obtain said license key, which is not the discarded license key, from said data recording apparatus at a timing that allows said encrypted content data to be reproduced continuously, the data reproduction circuit further comprising a certificate hold unit holding a certificate unique to the data reproduction circuit for said data recording apparatus, wherein said certificate hold unit externally outputs said certificate to obtain said license key and said second reproduction control information from said data recording apparatus, and said reproduction control unit receives said license and said second reproduction control information from said data recording apparatus when said certificate is authenticated in said data recording apparatus, wherein said certificate includes a public key that is unique to the data reproduction circuit and uniquely corresponds to the certificate itself, said data reproduction circuit further comprising:

private key hold means holding a private key for decrypting data encrypted by said public key;

first decryption processing means decrypting the data encrypted by said public key using said private key;

session key generation means generating a first session key for identifying a process of obtaining said license key from said data recording apparatus;

encryption processing means encrypting data using a second session key generated in said data recording apparatus; and second decryption processing means decrypting data encrypted by said first session key, wherein when said license key and said second reproduction control information are obtained from said data recording apparatus, said session key generation means generates said first session key, said first decryption processing means decrypts said second session key encrypted by said public key using said public key, said encryption processing means encrypts said first session key using the second session key obtained by said first decryption processing means, said reproduction control unit applies said second session key encrypted by externally received said public key to said first decryption processing means, externally outputs said first session key encrypted by said second session key, and applies said license key and said second reproduction control information encrypted by said first session key to said second decryption processing means, and said second decryption processing means decrypts said license key and said second reproduction control information encrypted by said first session key in said data recording apparatus using said first session key, and applies the decrypted license key and second reproduction control information to said reproduction control unit.

11. A data recording apparatus recording a license key, first reproduction control information and second reproduction control information for encrypted content data of which reproduction is defined by said first reproduction control information that specifies an allowable output count of said license key for decrypting encrypted content data to be output to a data reproduction apparatus and said second reproduction control information that specifies an allowable hold time of the output license key in said data reproduction apparatus, comprising:

storage means storing said license key, said first reproduction control information and said second reproduction control information;

an interface for data transfer to/from said data reproduction apparatus; and control means, wherein said control means reads said first reproduction control information from said storage means in response to an output request for said license key that is input via said interface to determine whether or not an output count of said license key exceeds the allowable output count specified by said read first reproduction control information, and, when said output count does not exceed said allowable output count, subtracts from and updates said allowable output count and performs a reproduction permission process of outputting said license key and said second reproduction control information read from said storage means to said data reproduction apparatus via said interface, the data recording apparatus further comprising decryption processing means decrypting encrypted data encrypted by a public authentication key using said public authentication key, wherein said control means receives a certificate encrypted by said public authentication key from said data reproduction apparatus via said interface, applies said encrypted certificate to said decryption processing means, and receives the certificate decrypted by said decryption processing means, the data recording apparatus further comprising:

session key generation means generating a session key for identifying communication with said data reproduction apparatus; and encryption processing means encrypting data using a public encryption key that is unique to said data reproduction apparatus and uniquely corresponds to said certificate, wherein when said certificate is accepted, said session key generation means generates a first session key for identifying communication with said data reproduction apparatus, said encryption processing means encrypts said first session key using said public encryption key, and said control means outputs said encrypted first session key to said data reproduction apparatus via said interface.

12. The data recording apparatus according to claim 11, further comprising:

another decryption processing means decrypting encrypted data encrypted by said session key; and another encryption processing means encrypting data using said session key, wherein in said reproduction permission process, said control means receives via said interface encrypted data created by encrypting a second session key generated in said data reproduction apparatus using said first session key, applies said encrypted data to said another decryption processing means, applies said license key and said second reproduction control information read from said storage means to said another encryption processing means, and outputs said license key and said second reproduction control information encrypted by said second session key to said data reproduction apparatus via said interface, said another decryption processing means decrypts said encrypted data using said first session key for application to said another encryption processing means, and said another encryption processing means encrypts said license key and said second reproduction control information using said second session key obtained by said another decryption processing means.

\* \* \* \* \*